United States Patent
Wang et al.

(10) Patent No.: US 10,523,771 B2
(45) Date of Patent: Dec. 31, 2019

(54) DATA COLLECTION METHOD, DEVICE, AND SYSTEM

(71) Applicant: Tencent Technology (Shenzhen) Company Limited, Shenzhen, Guangdong (CN)

(72) Inventors: Chao Wang, Guangdong (CN); Xiao Guo, Guangdong (CN); Lingfang Zhong, Guangdong (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 269 days.

(21) Appl. No.: 15/485,675

(22) Filed: Apr. 12, 2017

(65) Prior Publication Data
US 2017/0223123 A1 Aug. 3, 2017

Related U.S. Application Data

(63) Continuation of application No. PCT/CN2016/079051, filed on Apr. 12, 2016.

(30) Foreign Application Priority Data

Apr. 16, 2015 (CN) .......................... 2015 1 0180699

(51) Int. Cl.
*G06F 15/173* (2006.01)
*H04L 29/08* (2006.01)
(Continued)

(52) U.S. Cl.
CPC .......... *H04L 67/22* (2013.01); *A63B 24/0006* (2013.01); *G06F 11/3006* (2013.01);
(Continued)

(58) Field of Classification Search
CPC ......... H04L 67/22; H04L 67/18; H04L 67/12; G06F 11/3006; G06F 11/3438;
(Continued)

(56) References Cited

U.S. PATENT DOCUMENTS 8,781,716 B1 * 7/2014 Wenneman ........ G01C 21/3484
701/118
2011/0093820 A1 * 4/2011 Zhang ..................... A63F 13/06
715/863
(Continued)

FOREIGN PATENT DOCUMENTS

| CN | 101408993 A | 4/2009 |
| CN | 102804238 A | 11/2012 |
| CN | 104462308 A | 3/2015 |

OTHER PUBLICATIONS

International Search Report and Written Opinion of the ISA, Haidian District, Beijing, regarding Application No. PCT/CN2016/079051, dated Jun. 28, 2016.

*Primary Examiner* — Krisna Lim
(74) *Attorney, Agent, or Firm* — Harness, Dickey & Pierce, P.L.C.

(57) ABSTRACT

A data collection method, a device, and a system are provided for automatically obtaining a user's movement interests. The data collection method includes: a movement information collection device obtaining a user's movement data; analyzing said user's movement data and determining the user's movement preferences according to said movement data; sending the user's information of the movement preference to a server, so that the server determines according to the user's information of the movement preference other users corresponding to said movement preferences. It is thus possible to automatically obtain a user's movement preferences.

20 Claims, 16 Drawing Sheets

(51) Int. Cl.
*A63B 24/00* (2006.01)
*G06F 11/30* (2006.01)
*G06F 11/34* (2006.01)

(52) U.S. Cl.
CPC .. *G06F 11/3438* (2013.01); *A63B 2024/0009* (2013.01); *A63B 2220/30* (2013.01); *A63B 2220/40* (2013.01)

(58) Field of Classification Search
CPC ............ A63B 24/0006; A63B 2220/40; A63B 2200/30; A63B 2024/0009
USPC ........................................................ 709/224
See application file for complete search history.

(56) References Cited

U.S. PATENT DOCUMENTS

| | | | |
|---|---|---|---|
| 2013/0201113 A1* | 8/2013 | Hinckley | G06F 3/0487 345/173 |
| 2014/0198954 A1* | 7/2014 | Bulzacki | G06K 9/00342 382/103 |
| 2016/0101784 A1* | 4/2016 | Olson | B60K 35/00 340/576 |
| 2016/0287166 A1* | 10/2016 | Tran | H04B 1/3827 |

\* cited by examiner

DATA COLLECTION METHOD, DEVICE, AND SYSTEM

The present application is a continuation of International Patent Application No. PCT/CN2016/079051 filed on Apr. 12, 2016, which claims the priority to Chinese Patent Application No. 201510180699.9, titled "DATA COLLECTION/PROCESSING METHOD, MOVEMENT INFORMATION COLLECTION DEVICE, AND SYSTEM", filed on Apr. 16, 2015 with the State Intellectual Property Office of the People's Republic of China, both of which are incorporated herein by reference in their entireties.

TECHNICAL FIELD

The present disclosure relates to the field of communications technology, and in particular to a data collection method, a data collection device and a data collection system.

BACKGROUND

With the development of social network technology, a user may find a friend with a same interest on the social network. In the current social software, the user has to fill in his interest manually after logging in a social account, so that a system assigns the user to a group corresponding to the interest based on the interest inputted by the user. Then, the user may find a friend with the same interest in the group. However, the social software relies on the manually inputted interest by the user, which is cumbersome, and thus the user may skip the input step.

In addition, in daily life, the user often needs to move at different locations, such as: from home to work, from home to a shopping mall, etc. In the above moving scenes, the user may want to know some users with similar moving tracks for, for example, getting a traffic condition through the users, going along with the users, sharing things on the moving tracks with the users, etc. With the conventional technology for recommending users to a user, only users with similar origins and destinations can be recommended to the user, not including users with similar tracks to the user.

SUMMARY

A data collection method, a data collection device and a data collection system are provided according to an embodiment of the present disclosure, which can automatically obtain a user preference.

A data collection method is provided according to an embodiment of the present disclosure, which includes: in a movement information collection device, obtaining movement data of a user;

analyzing the movement data of the user and determining a movement preference of the user based on the movement data; and sending information of the movement preference of the user to a server such that the server determines, based on the information of the movement preference of the user, other user corresponding to the movement preference.

Preferably, the analyzing the movement data of the user and determining a movement preference of the user based on the movement data includes: analyzing the movement data of the user and determining a movement type of the user based on the movement data.

The sending information of the movement preference of the user to a server such that the server determines, based on the information of the movement preference of the user, other user corresponding to the movement preference includes: sending information of the movement type of the user to the server such that the server assigns, based on the information of the movement type of the user, the user to a group which includes other user corresponding to the movement type.

Preferably, the method further includes: obtaining a movement position and/or a movement time of the user; and sending the movement position and/or the movement time to the server such that the server assigns, based on the movement position and/or the movement time, the user to a group which includes other user corresponding to the movement position and/or the movement time.

Preferably, an acceleration sensor is arranged in the movement information collection device.

The obtaining the movement data of the user includes: detecting, by the acceleration sensor, a movement speed of the user.

The analyzing the movement data of the user and determining the movement type of the user based on the movement data includes: determining the movement type of the user as jogging, in a case of detecting that the movement speed of the user in a first preset time period is greater than a first preset value.

Preferably, a gyroscope is arranged in the movement information collection device.

The obtaining the movement data of the user includes: detecting, by the gyroscope, a swing angle of the user.

The analyzing the movement data of the user and determining the movement type of the user based on the movement data includes: determining the movement type of the user as a ball game, in a case of detecting that the swing angle of the user in a second preset time period is greater than a second preset value.

Preferably, the analyzing the movement data of the user and determining the movement type of the user based on the movement data includes: detecting a number of times that the movement data of the user meets a preset condition in a preset period; and determining the movement type of the user as a movement type corresponding to the preset condition, in a case of detecting that the number of times reaches a third preset value.

Preferably, the analyzing the movement data of the user and determining a movement preference of the user based on the movement data includes: analyzing the movement data of the user and determining a source moving track of the user based on the movement data. The source moving track includes position information of multiple positions of movement of the user and time information of the source moving track.

The sending information of the movement preference of the user to a server such that the server determines, based on the information of the movement preference of the user, other user corresponding to the movement preference includes: sending the source moving track of the user to the server such that the server determines a recommended user based on the source moving track of the user. The recommended user includes a user that moves in at least one position of the multiple positions in a target time, and a difference between the target time and a time represented by the time information is less than a preset time threshold.

The method further includes: receiving user information of the recommended user returned by the server.

Preferably, the determining the source moving track of the user includes: obtaining position information and time information of a start point when the user starts to move;

obtaining position information and time information of multiple positions during movement of the user; obtaining position information and time information of an end point when the user stops moving; and generating the source moving track including the position information and the time information of the start point, the multiple positions and the end point.

Preferably, the generating the source moving track including position information and time position of the start point, the multiple positions and the end point includes: determining whether a specific path exists in a path of the movement of the user based on the position information and the time position of the multiple positions, and if the specific path exists in the path of the movement of the user, performing a rarefying operation on several positions located in the specific path among the multiple positions to obtain multiple rarefying positions; and generating a source moving track including position information and time information of the start point, multiple non-rarefying positions, the multiple rarefying positions and the end point. And the multiple non-rarefying positions are several positions which are not located in the specific path among the multiple positions.

Preferably, the specific path includes at least one of a congested path and a straight path.

Preferably, the recommended user includes: a user that moves in at least one road section of multiple road sections passed through by the source moving track in the target time. A difference between the target time and a time interval formed by the start point and the end point of the source moving track is less than a preset time threshold. The multiple road sections passed through by the source moving track are obtained by the server performing a road section matching on the multiple positions included in the source moving track. The server further calculates an order in which the source moving track passes through the road sections, based on time information of the positions.

Preferably, the recommended user includes at least one of: a first user whose moving track in the target time coincides with the source moving track; a second user whose moving track in the target time is a portion of the source moving track; a third user whose moving track in the target time includes the source moving track; a fourth user whose moving track in the target time has a partial same path as the source moving track, where the partial same path is a continuous path; and a fifth user whose moving track in the target time has a partial same path as the source moving track, where a start point of movement of the fifth user is the same as a start point of the source moving track, and the partial same path is a discontinuous path.

A data collection method is provided according to an embodiment of the present disclosure, which includes:

receiving information of a movement preference of a user sent by a movement information collection device; and determining other user corresponding to the movement preference based on the information of the movement preference of the user.

Preferably, the receiving information of a movement preference of a user sent by a movement information collection device includes: receiving information of the movement type of the user sent by the movement information collection device.

The determining other user corresponding to the movement preference based on the information of the movement preference of the user includes: assigning, based on the information of the movement type of the user, the user to a group including other user corresponding to the movement type.

Preferably, the method further includes: receiving a movement position and/or a movement time of the user; and assigning, based on the movement position and/or the movement time, the user to a group including other user corresponding to the movement position and/or the movement time.

Preferably, the receiving information of a movement preference of a user sent by a movement information collection device includes: receiving a source moving track sent by the movement information collection device, where the source moving track includes position information of multiple of positions of movement of the user and time information of the source moving track.

The determining other user corresponding to the movement preference based on the information of the movement preference of the user includes: searching for a user that moves in at least one position of the multiple positions in a target time based on the source moving track, and taking the user as a recommended user, where a difference between the target time and a time represented by the time information is less than a preset time threshold.

The method further includes: sending user information of the recommended user.

Preferably, the source moving track includes: position information and time information of a start point, multiple positions and an end point of the source moving track, and a difference between the target time and a time interval formed by the start point and the end point of the source moving track is less than a preset time threshold.

Preferably, the searching for a user that moves in at least one position of the multiple positions in a target time based on the source moving track and taking the user as a recommended user includes: performing a road section matching on multiple positions included in the source moving track to obtain multiple road sections passed through by the source moving track, and calculating an order in which the source moving track passes through the road sections, based on time information of the positions; and searching for a user that moves in at least one road section of the multiple road sections passed through by the source moving track in the target time, and taking the user as the recommended user.

Preferably, the recommended user includes at least one of: a first user whose moving track in the target time coincides with the source moving track; a second user whose moving track in the target time is a portion of the source moving track; a third user whose moving track in the target time includes the source moving track; a fourth user whose moving track in the target time has a partial same path as the source moving track, where the partial same path is a continuous path; and a fifth user whose moving track in the target time has a partial same path as the source moving track, where a start point of movement of the fifth user is the same as a start point of the source moving track, and the partial same path is a discontinuous path.

Preferably, the searching for a user that moves in at least one road section of the multiple road sections passed through by the source moving track in the target time and taking the user as the recommended user includes: determining whether the first user exists, and taking the first user as the recommended user if the first user exists; determining whether the second user exists if the first user does not exist, and taking the second user as the recommended user if the second user exists; determining whether the third user exists if neither of the first user and the second user exists, and taking the third user as the recommended user if the third user exists; determining whether the fourth user exists if none of the first user, the second user and the third user exists, and taking the fourth user as the recommended user if the fourth user exists; and determining whether the fifth user exists if none of the first user, the second user, the third user and the fourth user exists, and taking the fifth user as the recommended user if the fifth user exists.

A movement information collection device is provided according to an embodiment of the present disclosure, which includes:

an obtaining module, configured to obtain movement data of a user;

an analysis module, configured to analyze the movement data of the user and determine a movement preference of the user based on the movement data; and a sending module, configured to send information of the movement preference of the user to a server such that the server determines, based on the information of the movement preference of the user, other user corresponding to the movement preference.

Preferably, the analysis module is further configured to analyze the movement data of the user and determine a movement type of the user based on the movement data.

The sending module is further configured to send information of the movement type of the user to the server such that the server assigns, based on the information of the movement type of the user, the user to a group which includes other user corresponding to the movement type.

Preferably, the obtaining module is further configured to obtain a movement position and/or a movement time of the user.

The sending module is further configured to send the movement position and/or the movement time to the server such that the server assigns, based on the movement position and/or the movement time, the user to a group which includes other user corresponding to the movement position and/or the movement time.

Preferably, the movement information collection device further includes an acceleration sensor.

The acceleration sensor is configured to detect a movement speed of the user.

The analysis module is further configured to determine the movement type of the user as jogging, in a case of detecting that the movement speed of the user in a first preset time period is greater than a first preset value.

Preferably, a gyroscope is arranged in the movement information collection device.

The gyroscope is configured to detect a swing angle of the user.

The analysis module is further configured to determine the movement type of the user as a ball game, in a case of detecting that the swing angle of the user in a second preset time period is greater than a second preset value.

Preferably, the analysis module is further configured to detect a number of times that the movement data of the user meets a preset condition in a preset time period; and determine the movement type of the user as a movement type corresponding to the preset condition, in a case of detecting that the number of times reaches a third preset value.

Preferably, the analysis module is further configured to analyze the movement data of the user and determine a source moving track of the user based on the movement data, where the source moving track includes position information of multiple positions of movement of the user and time information of the source moving track.

The sending module is further configured to send the source moving track of the user to the server such that the server determines a recommended user based on the source moving track of the user, where the recommended user includes a user that moves in at least one position of the multiple positions in a target time, and a difference between the target time and a time represented by the time information is less than a preset time threshold.

The movement information collection device further includes a receiving unit, configured to receive user information of the recommended user returned by the server.

Preferably, the obtaining module includes:

a first obtaining unit, configured to obtain position information and time information of a start point when the user starts to move;

a second obtaining unit, configured to obtain position information and time position of multiple positions during movement of the user; and a third obtaining unit, configured to obtain position information and time position of an end point when the user stops moving, and the analysis module is further configured to generate a source moving track including the position information and the time information of the start point, the multiple positions and the end point.

Preferably, the analysis module includes:

a rarefying unit, configured to determine whether a specific path exists in a path of the movement of the user based on the position information and the time position of the multiple positions, and if the specific path exists in the path of the movement of the user, perform a rarefying operation on several positions located in the specific path among the multiple positions to obtain multiple rarefying positions; and a generating unit, configured to generate a source moving track including position information and time information of the start point, multiple non-rarefying positions, the multiple rarefying positions and the end point, where the multiple non-rarefying positions are several positions which are not located in the specific path among the multiple positions.

Preferably, the recommended user includes: a user that moves in at least one road section of multiple road sections passed through by the source moving track in the target time. A difference between the target time and a time interval formed by the start point and the end point of the source moving track is less than a preset time threshold. The multiple road sections passed through by the source moving track are obtained by the server performing a road section matching on the multiple positions included in the source moving track. The server further calculates an order in which the source moving track passes through the road sections, based on time information of the positions.

A server is provided according to an embodiment of the present disclosure, which includes:

a receiving module, configured to receive information of a movement preference of a user sent by a movement information collection device; and a processing module, configured to determine other user corresponding to the movement preference based on the information of the movement preference of the user.

Preferably, the receiving module is configured to receive information of the movement type of the user sent by the movement information collection device.

The processing module is configured to assign, based on the information of the movement type of the user, the user to a group which includes other user corresponding to the movement type.

Preferably, the receiving module is further configured to receive a movement position and/or a movement time of the user.

The processing module is further configured to assign, based on the movement position and/or the movement time, the user to a group which includes other user corresponding to the movement position and/or the movement time.

Preferably, the receiving module is configured to receive a source moving track sent by the movement information collection device, where the source moving track includes position information of multiple positions of movement of the user and time information of the source moving track.

The processing module is configured to search for a user that moves in at least one position of the multiple positions in a target time based on the source moving track, and take the user as a recommended user, where a difference between the target time and a time represented by the time information is less than a preset time threshold.

The server further includes: a sending module, configured to send user information of the recommended user.

Preferably, the source moving track includes: position information and time information of a start point, multiple positions and an end point of the source moving track, and a difference between the target time and a time interval formed by the start point and the end point of the source moving track is less than a preset time threshold.

Preferably, the processing module includes:

a matching unit, configured to perform a road section matching on multiple positions included in the source moving track to obtain multiple road sections passed through by the source moving track, and calculate an order in which the source moving track passes through the road sections, based on time information of the positions; and a searching unit, configured to search for a user that moves in at least one road section of the multiple road sections passed through by the source moving track in the target time, and take the user as the recommended user.

A movement information collection system is provided according to an embodiment of the present disclosure, which includes the above movement information collection device and the above server.

In the present disclosure, the movement information collection device analyzes collected movement data of a user, determines the movement preference of the user based on the movement data, and sends the information of the movement preference to the server, so that the server determines other user corresponding to the movement preference based on the movement preference of the user. Thus, the user preference can be obtained automatically, and the user preference analyzed by the movement information collection device based on the collected data can fit real situation of the user.

DETAILED DESCRIPTION OF THE EMBODIMENTS

A data collection/processing method, a movement information collection device, a server and a system are provided according to an embodiment of the present disclosure, which are configured to automatically obtain a movement preference of a user.

In order that those skilled in the art better understand the present disclosure, the technical solution according to embodiments of the present disclosure will be described clearly and completely as follows in conjunction with the accompany drawings in the embodiments of the present disclosure. It is obvious that the described embodiments are only a part of the embodiments according to the present disclosure. All the other embodiments obtained by those skilled in the art based on the embodiments in the present disclosure without any creative work fall in the scope of the present disclosure.

Terms "comprise", "have" and any variations thereof in the specification and claims of the present disclosure and the above drawings are intended to cover non-exclusive inclusion. For example, a process, a method, a system, a product or a device including a series of steps or units are not limited to explicitly listed steps or units, and may include other steps or units that are not explicitly listed or inherent to such the process, the method, the system, the product or the device.

Figure 1:
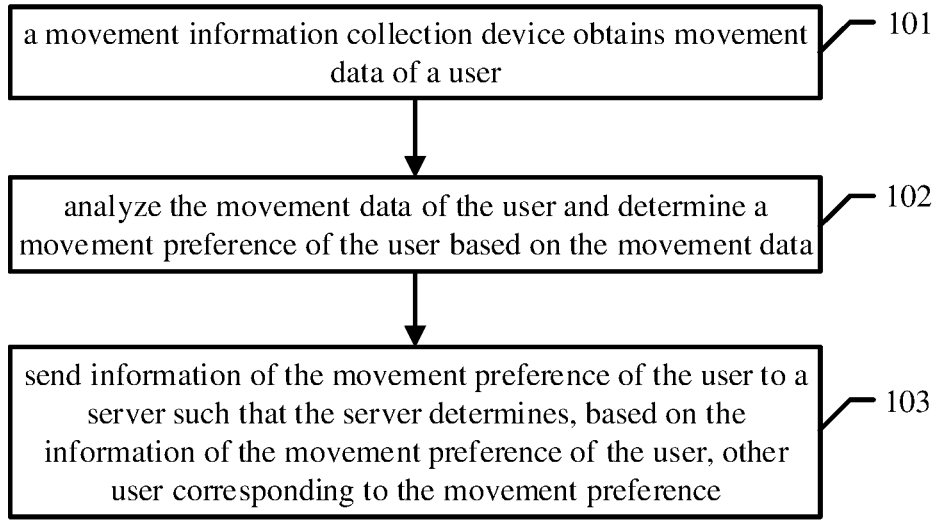
FIG. 1 is a flow chart of a data collection method according to an embodiment of the present disclosure.

Referring to FIG. 1, a data collection method according to an embodiment of the present disclosure is shown. The method may be applied to a movement information collection device. And the method includes steps 101 to 103.

In step 101, the movement information collection device obtains movement data of a user.

In step 102, the movement data of the user is analyzed, and based on the movement data, a movement preference of the user is determined.

In step 103, information of the movement preference of the user is sent to a server, so that based on the information of the movement preference of the user the server determines other user corresponding to the movement preference.

First Embodiment

Figure 2:
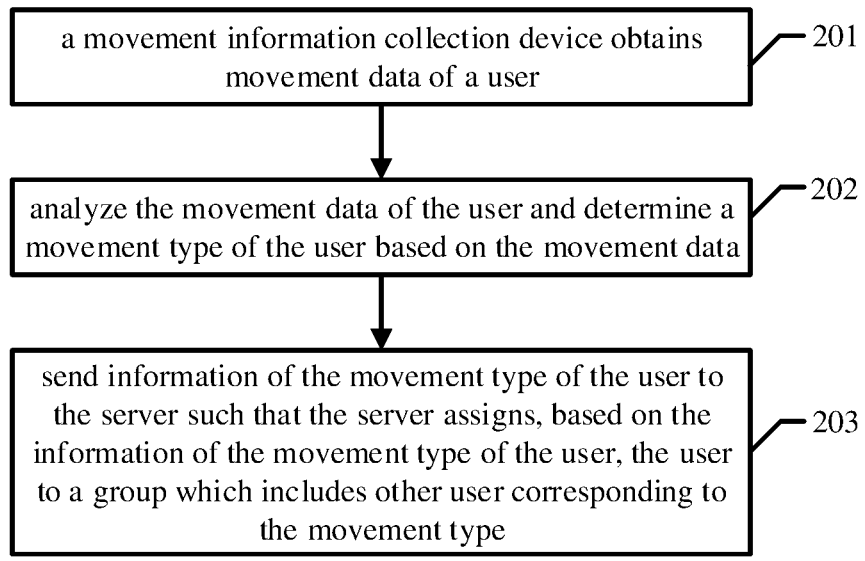
FIG. 2 is a flow chart of a data collection method according to an embodiment of the present disclosure.

Referring to FIG. 2, a data collection method according to an embodiment of the present disclosure is shown. The method may be applied to a movement information collection device. The movement information collection device may be any device capable of collecting user movement information. In the embodiment, the movement information collection device may be a wearable device, such as a smart watch, a smart bracelet and a smart phone, etc., which is not limited herein.

As shown in FIG. 2, the data collection method according to the embodiment of the present disclosure includes steps 201 to 203.

In step 201, the movement information collection device obtains movement data of a user.

In the embodiment, the movement information collection device is a wearable device. The user may wear the movement information collection device, so that the movement information collection device moves with the motion of the user. Thus, the movement information collection device may obtain the movement data of the user by detecting its own movement data.

For example, a movement information collection device arranged with an acceleration sensor may detect its own speed. The moving user wears the movement information collection device, so that the movement speed of the movement information collection device is the same as the movement speed of the user. The movement information collection device obtains the movement data of the user by detecting its own movement data through the acceleration sensor.

Alternatively, the movement information collection device arranged with a gyroscope may detect a change of its own inclination angle. The moving user may wear the movement information collection device on his hand or other part, so that the inclination angle of the movement information collection device is the same as the inclination angle of the user hand or other part. The movement information collection device obtains the change of the inclination angle of the user hand or other part through the gyroscope detecting its own change of the inclination angle.

Alternatively, the movement information collection device may determine whether the user is in motion by obtaining human body data of the user, then obtains the movement data of the user. Certainly, the movement information collection device may also obtain the movement data of the user by other means, which is not limited herein.

In step 202, the movement data of the user is analyzed, and based on the movement data a movement type of the user is determined.

The movement information collection device may analyze the obtained movement data, to obtain the movement type of the user.

In the embodiment, the movement preference of the user refers to the movement type preferred by the user. Since motions for different types of movement are different, on detecting that the movement data of the user conforms to predetermined conditions, it is determined that the user is in a certain type of movement, and then the movement type of the user is assigned to the type of movement.

For example, an acceleration sensor is arranged in the movement information collection device. When the acceleration sensor detects the movement speed in a first preset time period is greater than a first preset value (such as 30 minutes), the movement information collection device determines the user is jogging, and then assigns the movement type of the user as jogging.

Alternatively, a gyroscope is arranged in the movement information collection device. The user wears the movement information collection device on his hand. When the gyroscope detects a swing angle in a second preset time period is greater than a second preset value, the movement information collection device determines that the user is in a ball game, and then assigns the movement type of the user to a ball game. Certainly, the gyroscope may also distinguish which ball-type movement the user is in based on the difference of the swing angle change in the second preset time period, and then assigns the movement type of the user to the ball-type movement.

In step 203, the information of the movement type of the user is sent to a server, so that the server assigns, based on the information of the movement type of the user, the user to a group which includes other user corresponding to the movement type.

In the embodiment, a social account of the user is registered in the movement information collection device, and the information of the movement preference of the user is sent to the server through the social account of the user. In an embodiment, the movement preference of the user refers to a movement type preferred by the user. Multiple different movement types are recorded in the server, and the different movement types correspond to different groups. Each group includes a user whose movement preference is a movement type corresponding to the group. Then, the user may find other user with the same preference in the group.

In the embodiment, the movement information collection device analyzes collected movement data of a user, determines the movement type of the user based on the movement data, and sends the information of the movement type to the server, so that based on the information of the movement type of the user the server assigns the user to a group corresponding to the movement type. In this way, a series of cumbersome processes, such as a process for the user to enter his preference when logging into the social account, are avoided. The user preference can be obtained automatically, and the user preference analyzed by the movement information collection device based on the collected data can fit real situation of the user.

In the embodiment, when analyzing the movement data of the user, the movement information collection device determines the movement type of the user. In practice, the type of movement of the user generally occurs several times, and a type of movement which occurs once or twice occasionally is not necessarily the movement preference of the user. The movement information device may determine the movement type for the user preference by adding a judgment condition. Preferably, in the step 102 according to the embodiment, the movement information collection device analyzing the movement data of the user and determining the movement type of the user based on the movement data further includes the following steps. A number of times that the movement data of the user conforms to a preset condition in a preset time period is detected. When it is detected that the number of times reaches a third preset value, the movement information collection device determines the movement type of the user as a movement type corresponding to the preset condition.

When detecting that the movement data of the user conforms to the preset condition, the movement information collection device may determine the user is performing a movement of a certain type, and the movement information collection device accumulates the number of times that the user performs the movement of the type. After accumulation, the movement information collection device detects a sum of the number of times the user has accumulated in a preset period (e.g., in a month). When it is detected the number of the times that the user performs a first type movement reaches the third preset value, it may be determined that the user preference is the first movement type. In this way, the classification for the user movement preference can better fit the true preference of the user.

Figure 3:
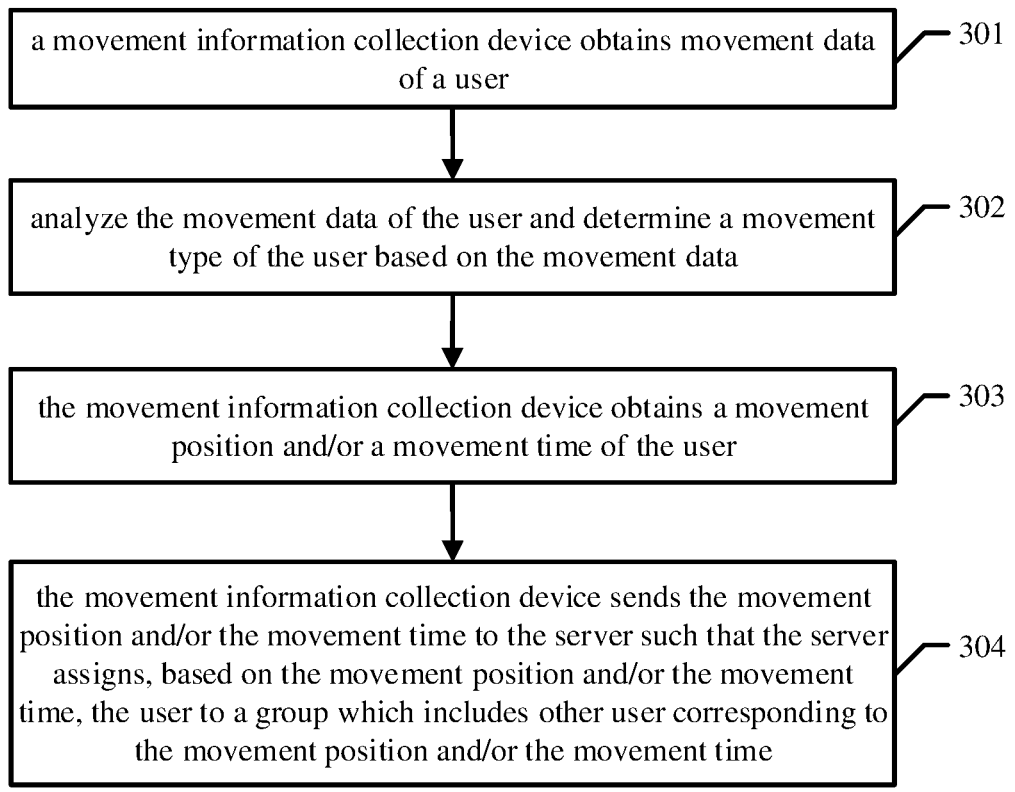
FIG. 3 is a flow chart of a data collection method according to an embodiment of the present disclosure.

In the above embodiment, the movement information device sends the type information of the user to the server, so that based on the type information of the user the server divides users in group. In practice, in order to be more precise for the server in grouping, distinguishing dimensions may be added for the server, that is, parameters detected by the movement information device may be added. Referring to FIG. 3, the data collection method according to another embodiment includes steps 301 to 304.

In step 301, a movement information collection device obtains movement data of a user.

For a specific description of the step, reference may be made to of the description of the above step 201 according to the embodiment shown in FIG. 2.

In step 302, the movement data of the user is analyzed, and based on the movement data a movement type of the user is determined.

For a specific description of the step, reference may be made to of the description of the above step 202 according to the embodiment shown in FIG. 2.

In step 303, the movement information collection device further obtains a user movement position and/or a movement time of the user.

The movement information collection device may obtain a current position and/or a current time corresponding to the movement data of the user. Then, the current position is a movement preference position of the user, and the current time is a movement preference time of the user.

Specially, a global positioning system may be arranged in the movement information collection system, to obtain the current position of the movement information collection device through the global positioning system.

In step 304, the movement information collection device sends the information of the movement type of the user, and the movement position and/or the movement time to the server, so that based on the information of the movement type, the geographical position and/or the movement time, the server assigns the user to a group which includes other user corresponding to the movement type, the geographical position and/or the movement time.

Specifically, for example, one of established groups is a morning run group. The user may be assigned to the morning group if the movement information collection device detects that the user performs a morning run between 6 am and 7 am.

Alternatively, one of the established groups is a badminton group in a gymnasium. The user may be assigned to the badminton group in the gymnasium if the movement information collection device detects that the user plays badminton in the gymnasium.

Certainly, the above is only described by way of example without limitation.

In the embodiment, the movement information collection device detects the information of the movement type of the user, and the time and/or the position for performing the preferred movement, to be more precise for the server in grouping and help the user to find other user with more common preferences in the group.

Second Embodiment

Figure 4:
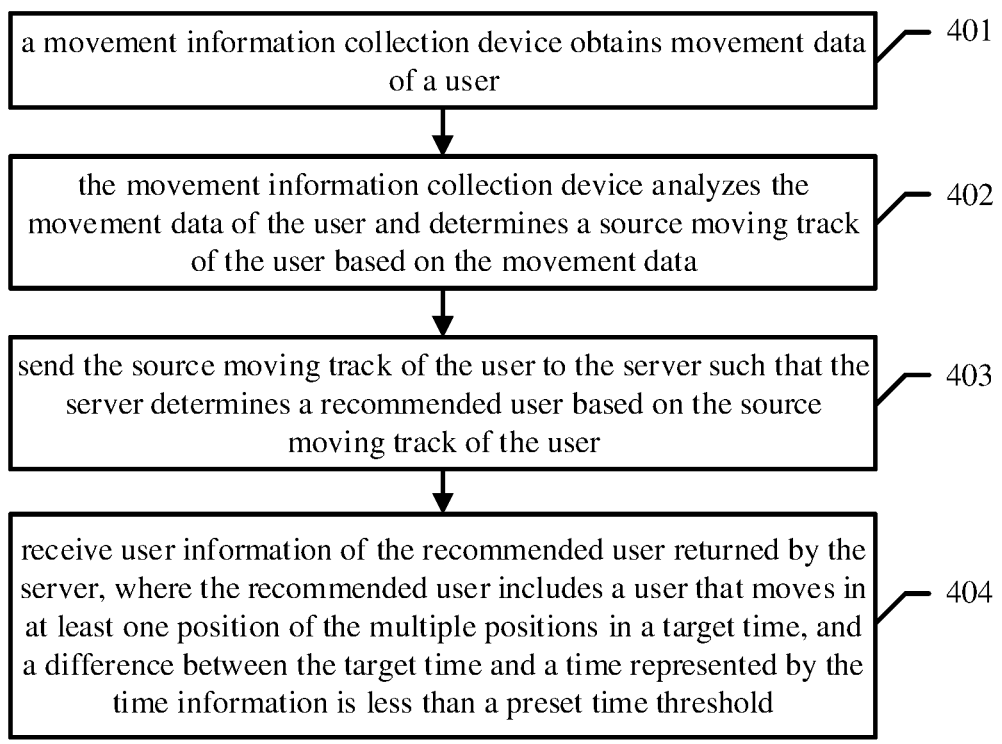
FIG. 4 is a flow chart of a data collection method according to an embodiment of the present disclosure.

Referring to FIG. 4, a data collection method according to an embodiment of the present disclosure is shown. The method includes steps 401 to 403.

In step 401, a movement information collection device obtains movement data of a user.

In step 402, the movement information collection device analyzes the movement data of the user, and determines a source moving track of the user based on the movement data. The source moving track includes position information of multiple positions of movement of the user and time information of the source moving track.

The above movement information collection device may be a device which executes the method, such as a user terminal. According to the embodiment of the present disclosure, the user terminal may be any intelligent terminal with a network function and a positioning function, such as a vehicle device, a tablet computer, a mobile phone, an electronic reader, a remote control, a notebook computer, a wearable device and other intelligent device with a network function and a positioning function. In addition, the moving track according to the embodiment of the present disclosure includes, but is not limited to, a moving track of a walking user carrying the user terminal and a traveling track of a user carrying the user terminal on a vehicle. The above multiple positions may be positions of the user at equal time intervals in the above source moving track, or positions of the user at equal distances in the above source moving track, or positions of the user at any time points in the above source moving track, and the like. The above position information may be geographic position information, such as latitude, longitude and orientation information, and may further include positioning accuracy information. Thus through the above position information, the position of the user may be known clearly. The time information of the above source moving track may be time information of the above multiple positions included in the source moving track, that is, time information of the respective position, so that the time of the user at different positions may be known through the time information. Alternatively, the time information of the above source moving track may include time interval information of the source moving track, that is, a time period during which the user moves in the source moving track.

In step 403, the source moving track is sent to a server, so that based on the source moving track the server determines a recommended user.

When receiving the above source moving track, the server may search for a user that moves in at least one position of the multiple positions in a target time, and take the user as a recommended user.

In step 404, user information of the recommended user returned by the server is received. The recommended user includes a user that moves in at least one position of multiple positions in a target time. A difference between the target time and a time represented by the time information is less than a preset time threshold.

The user information of the above recommended user may include a user name, a user ID, a user avatar, a user mailbox of the recommended user and other information which can identify the user.

Through the above step, a user that moves in at least one position of the source moving track in a target time may be recommended, and a difference between the target time and a time represented by the time information is less than a preset time threshold. That is, the recommended user is a user that moves with the user in at least same position at the same or similar time. Users that move in the same position at the same or similar time tend to have same preferences or handle same business. Alternatively a certain purpose may be achieved through meetings these users, such as enriching life, enriching emotion and developing business. It can be seen the above method for recommended user is meaningful in daily life.

Optionally, the above method may be applied to a user terminal.

Optionally based on the above user information, the method may also add the above recommended user as a user. In addition, in the embodiment, the above recommended user may be one or more users.

In the above technical scheme, a source moving track of a user is obtained, and the source moving track is sent to a server. Then, the server may determine a recommended user based on the source moving track. Thus, user information of the recommended user returned by the server is received. The recommended user includes a user that moves in at least one position of the multiple positions in a target time, and a difference between the target time and a time represented by the time information is less than a preset time threshold, so that a user who has a similar moving track as the user may be recommended to the user with the embodiment.

Figure 5:
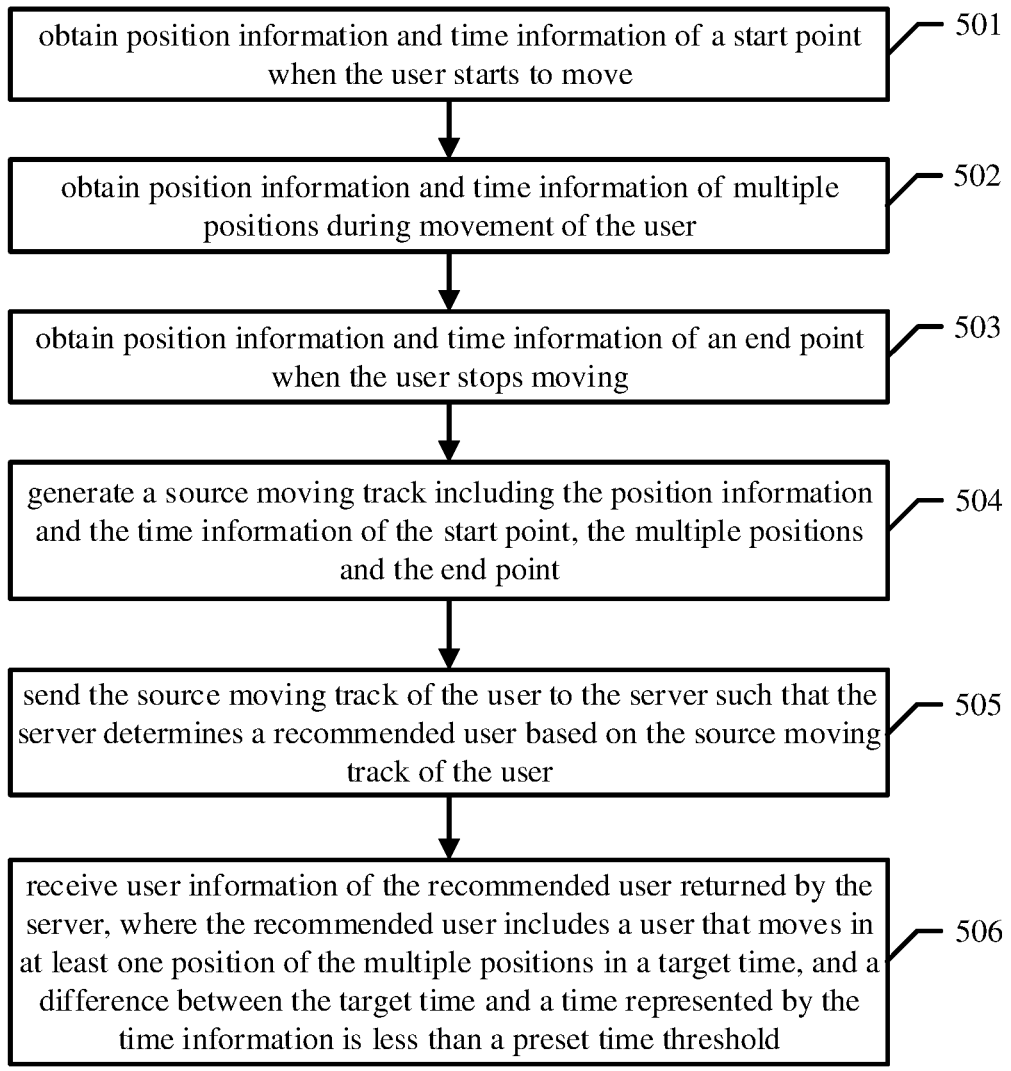
FIG. 5 is a flow chart of a data collection method according to an embodiment of the present disclosure.

Referring to FIG. 5, which is a flow chart of another data collection method according to an embodiment of the present disclosure, as shown in FIG. 5, the method includes the following steps.

In step 501, when the user starts to move, position information and time position of a start point are obtained.

Optionally, the step 501 may also receive an operation instruction inputted by the user, and set the start point based on the operation instruction. When the user moves from the start point, the position information and the time position of the start point are obtained. Thus the start point of a moving track may be set by the user.

In step 502, during movement of the user, position information and time position of multiple positions are obtained.

During movement of the user, the multiple positions may be obtained at equal time intervals. For example, position information and time information of the current position are obtained every 1 second or every 20 seconds. Alternatively during movement of the user, multiple positions may be obtained at equidistant intervals. For example, position information and time information of the current position are obtained every 10 meters or 50 meters. Alternatively during movement of the user, position information and time information of multiple positions may be obtained at random.

In step 503, when the user stops moving, position information and time information of an end point are obtained.

Optionally, the end of movement of the user may refer to that the user moves to a predetermined position, or that the user does not move in a predetermined time.

In step 504, a source moving track which includes position information and time information of the start point, the multiple positions and the end point is generated.

Then through the above steps, a moving track of the user may be obtained.

Optionally, the step 504 may include:

determining whether a specific path exists in a path of the movement of the user based on the position information and the time position of the multiple positions, and if so, performing a rarefying operation on several positions located in the specific path among the multiple positions to obtain multiple rarefying positions; and generating a source moving track which includes position information and time information of the start point, multiple non-rarefying positions, the multiple rarefying positions and the end point, where the multiple non-rarefying positions are several positions which are not located in the specific path among the multiple positions.

Based on the position information and the time information of the above multiple positions, any path of the source moving track may be determined. For example, position information of multiple positions in a path is similar, and time information of the multiple positions is also similar, then it is determined that a moving speed of the user on the path is slow and then the path is jammed. In the case, a rarefying operation may be performed on multiple positions of the specific path to obtain multiple rarefying positions. The rarefying operation may be understood as selecting a part of positions from the multiple positions. Specifically, a rarefying operation may be performed at specific position intervals, or may be performed based on a specific position number, such as 10 or 5 positions at a same interval are selected from 50 positions, or any 10 or 5 positions are selected from the 50 positions. For another example, if longitude or latitude information of the position information of multiple positions in a path is the same or similar, it may be determined that the path is straight without turning, and in this case, a moving track of the path may be obtained through a small number of positions. In this case, a rarefying operation may also be performed on the multiple positions of the specific path to obtain multiple rarefying positions. That is, the specific path may include at least one of: a congested path and a straight path.

In the embodiment, a rarefying operation is performed on multiple positions located in the specific path, so that the number of positions in the source moving track may be reduced, the computation cost is reduced, and the network traffic is saved.

In step 505, the source moving track is sent to the server, so that based on the source moving track the server determines the recommended user.

Optionally, in step 505, the source moving track may also be compressed, and send to the server, to save the network traffic.

In step 506, user information of the recommended user returned by the server is received. The recommended user includes a user that moves in at least one position of the multiple positions in a target time. A difference between the target time and a time represented by the time information is less than a preset time threshold.

Optionally, the above recommended user may include a user that moves in at least one road section of multiple road sections passed through by the source moving track in a target time A difference between the target time and a time interval formed by the start point and the end point of the source moving track is less than a preset time threshold. The multiple road sections passed through by the source moving track are obtained by the server performing a road section matching on multiple positions included in the source moving track. The server further calculates an order in which the source moving track passes through the road sections, based on time information of the positions.

Specifically, after receiving the above source moving track, the server may perform a road section matching on multiple positions included in the source moving track, to obtain multiple road sections passed through by the source moving track. And the server further calculates an order in which the source moving track passes through the road sections, based on time information of the positions. Then the server searches for a user that moves in at least one road section of multiple road sections passed through by the source moving track in a target time based on pre-obtained moving tracks of other user. For example, a searched user (i.e., the above recommended user) may be at least one of a first user, a second user, a third user, a fourth user and a fifth user described below. The first user, the second user, the third user, the fourth user and the fifth user may be described as follows.

The moving track of the first user in the target time coincides with the source moving track;

The moving track of the second user in the target time is a portion of the source moving track;

The moving track of the third user in the target time includes the source moving track;

The moving track of the fourth user in the target time has a partial same path as the source moving track, where the partial same path is a continuous path; and The moving track of the fifth user in the target time has a partial same path as the source moving track, where a start point of movement of the fifth user is the same as a start point of the source moving track, and the partial same path is a discontinuous path.

Figure 6:
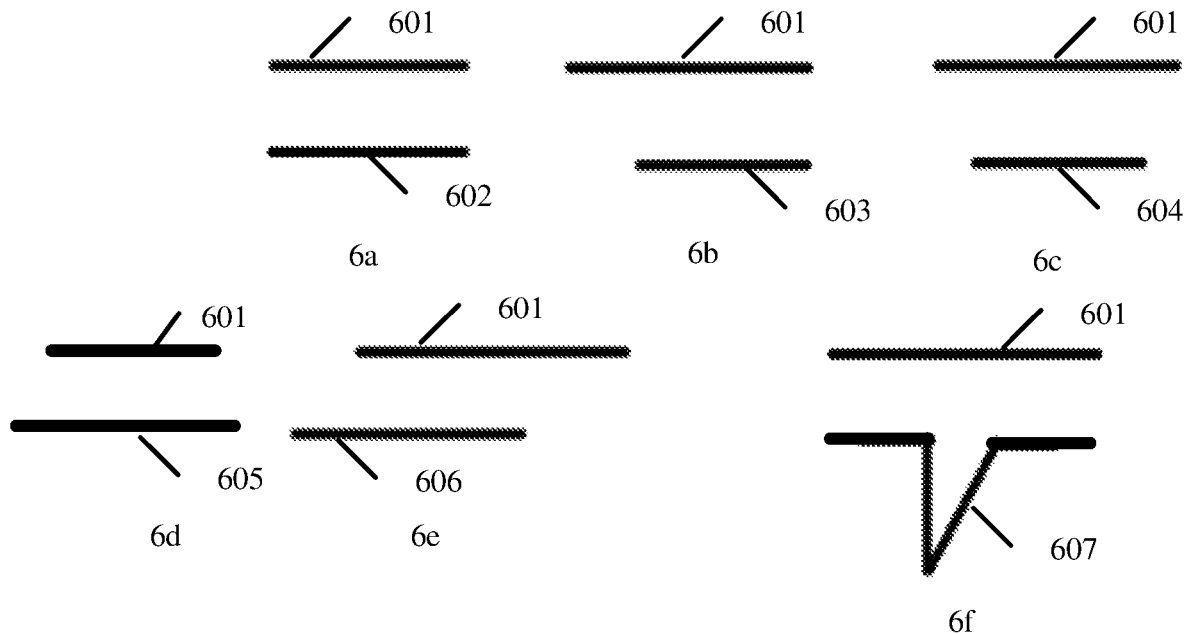
FIG. 6 is a schematic diagram of multiple alternative moving tracks according to an embodiment of the present disclosure.

Optionally, the above first user may further be a first user moving in a first moving track in the target time. A start point and an end point of the first moving track are respectively the same as a start point and an end point of the source moving track, and the first moving track includes the same road sections as the road section of the source moving track. Since the start point and the end point of the first moving track are the same as the start point and the end point of the source moving track respectively, and the first moving track includes the same road sections as the road section of the source moving track, the order in which the first moving track passes through each road section is also the same as the order in which the source moving track passes through each road section. For example, the above source moving track and the first moving track may be as shown in FIG. 6a, where the source moving track 601 is identical to the first moving track 602. It is learned from the above description that a moving track of the first user moving in the same or a similar time as the user moving in the source moving track is the same as the moving track of the user.

Optionally, the above second user may further be a second user moving in a second moving track in the target time. A start point of the second moving track is the same as a start point of the source moving track, or an end point of the second moving track is the same as an end point of the source moving track. The second moving track includes the same M road sections in the road section as the source moving track. And the order in which the second moving track passes through the M road sections is the same as the order in which the source moving track passes through the M road sections. M is an integer greater than 1. For example, the above source moving track and the second moving track may be as shown in FIG. 6b, where the end point of the source moving track 601 is identical to the end point of the second moving track 603, and the source moving track 601 includes the second moving track 603. It is learned from the above description that a moving track of the second user moving in the same or a similar time as the user moving in the source moving track is partially the same as the moving track of the user.

Optionally, the above second user may further be a second user moving in a second moving track in the target time. The second moving track includes the same M road sections in the road section as the source moving track. And the order in which the second moving track passes through the M road sections is the same as the order in which the source moving track passes through the M road sections. M is an integer greater than 1. For example, the above source moving track and a third moving track may be as shown in FIG. 6c, where the source moving track 601 includes a second moving track 604.

Optionally, the above third user may be a third user moving in a third moving track in the target time. The source moving track is a part of the third moving track. For example, the above source moving track and the third moving track may be as shown in FIG. 6d, where the third moving track 605 includes the source moving track 601.

Optionally, the above fourth user may be a fourth user moving in a fourth moving track in the target time. The fourth moving track includes the same H road sections as the source moving track. And the order in which the fourth moving track passes through the H road sections is the same as the order in which the source moving track passes through the H road sections. H is an integer greater than 1. For example, the above source moving track and the fourth moving track may be as shown in FIG. 6e, where the source moving track 601 includes a part of the fourth moving track 606. It is learned from the above description that a moving track of the fourth user moving in the same or a similar time as the user moving in the source moving track is partially the same as the moving track of the user.

Optionally, the above fifth user may be a fifth user moving in a fifth moving track in the target time. A start point and an end point of the fifth moving track are respectively the same as a start point and an end point of the source moving track, and the fifth moving track includes the same T road sections as the source moving track. T is an integer equal to or greater than the product of the total number of sections of the fourth moving track and a preset ratio. For example, if the total number of road sections in the fifth moving track is 20 and the preset ratio is 80%, the above T may be an integer which is equal to or greater than 16. For example, the above source moving track and the fifth moving track may be as shown in FIG. 6f, where the source moving track 601 has a partial same path as the fifth moving track 607, and the partial same path is a discontinuous path. It is learned from the above description that a moving track of the fifth user moving in the same or a similar time as the user moving in the source moving track is partially the same as the moving track of the user.

The above road section may be a road in practice, or may be a part of a road in practice. For example, a road may be divided into a south section, a middle section and a north section.

In addition, when the above recommended user includes multiple users of the first user, the second user, the third user, the fourth user and the fifth user, the server may further assign the multiple users with priorities. For example, the first user is divided into a first level, the second user is divided into a second level, the third user is divided into a third level, the fourth user is divided into a fourth level and the fifth user is divided into a fifth level. Thus, in step 506, the received recommended user may be displayed in accordance with the priorities, to improve the recommendation effect.

In the above technical solutions, multiple alternative implementations are described based on the embodiments, and thus multiple users with similar moving tracks may be recommended to the user.

Figure 7:
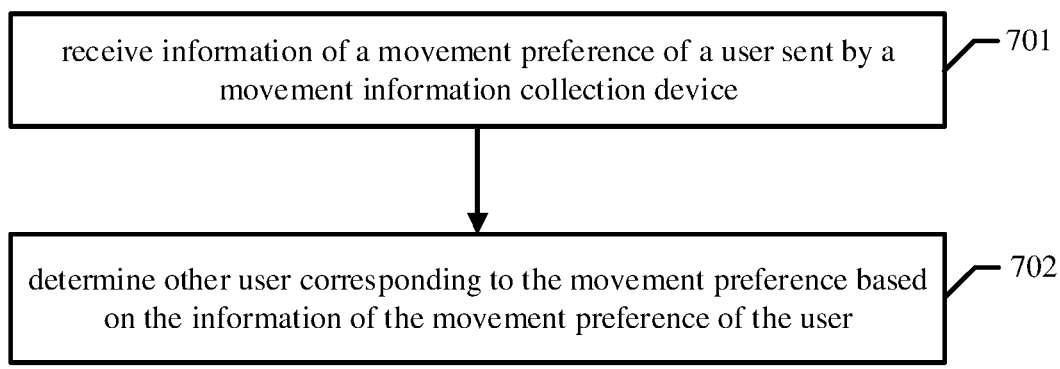
FIG. 7 is a flow chart of a data collection method according to an embodiment of the present disclosure.

The data collection method according to an embodiment of the present disclosure is described above in a view of a user. Hereinafter, a data collection method according to an embodiment of the present disclosure is described in a view of a server. Referring to FIG. 7, the data collection method 700 according to an embodiment of the present disclosure includes steps 701 and 702.

In step 701, information of a movement preference of a user sent by a movement information collection device is received.

In step 702, based on the information of the movement preference of the user, other user corresponding to the movement preference is determined.

First Embodiment

Figure 8:
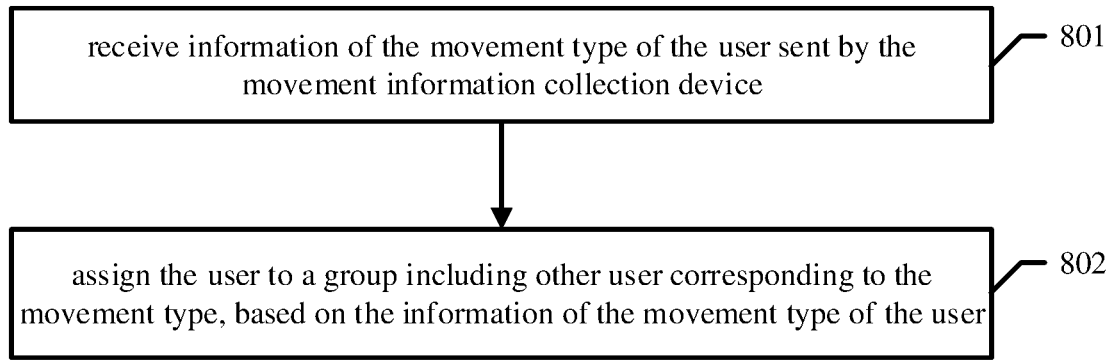
FIG. 8 is a flow chart of a data collection method according to an embodiment of the present disclosure.

Referring to FIG. 8, a data collection method according to an embodiment of the present disclosure is shown. The method includes steps 801 to 802.

In step 801, information of the movement type of the user sent by the movement information collection device is received.

In step 802, based on the information of the movement type of the user, the user is assigned to a group which includes other user corresponding to the movement type.

Second Embodiment

Figure 9:
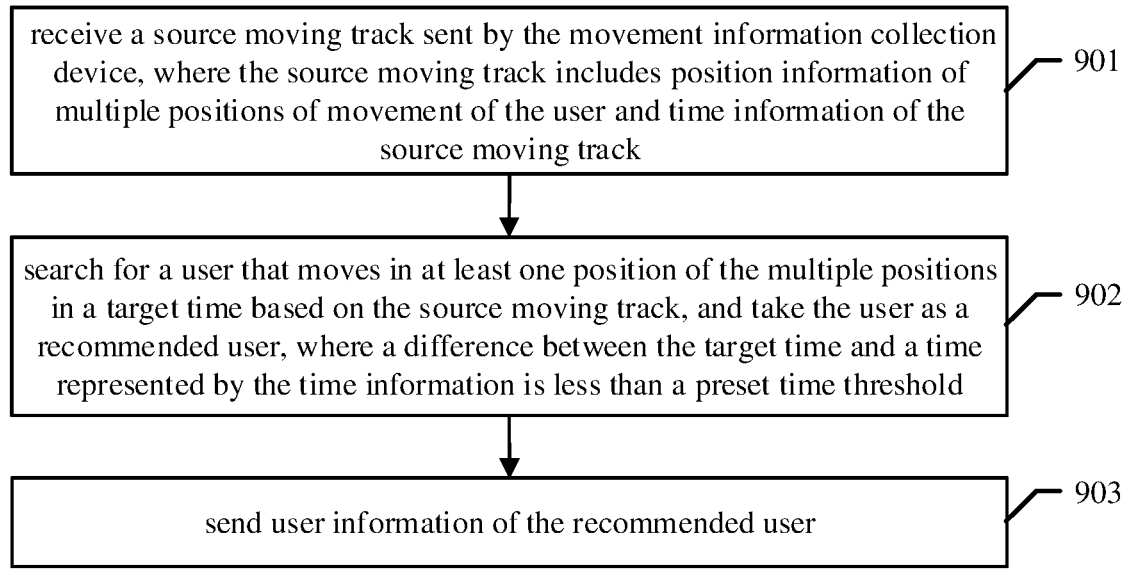
FIG. 9 is a flow chart of a data collection method according to an embodiment of the present disclosure.

Referring to FIG. 9, a data collection method according to an embodiment of the present disclosure is shown. As shown in FIG. 9, the method includes steps 901 to 903.

In step 901, a source moving track sent by the movement information collection device is received. And the source moving track includes position information of multiple positions of movement of the user and time information of the source moving track.

The above position information may be geographic position information, such as latitude, longitude and orientation information, and may further include positioning accuracy information. Thus through the above position information, the position of the user may be known clearly. The time information of the above source moving track may be time information of the above multiple positions included in the source moving track, that is, time information of the respective positions, so that the time of the user at different positions may be known through the time information. Alternatively, the time information of the above source moving track may include time interval information of the source moving track, that is, a time period during which the user moves in the source moving track.

In step 902, based on the source moving track, a user that moves in at least one position of the multiple positions in a target time is searched for, and the user is taken as a recommended user. And a difference between the target time and a time represented by the time information is less than a preset time threshold.

Before the step 902 is performed, a moving track of other user may be obtained, thus in step 902, the above recommended user may be searched for based on the pre-obtained moving track.

In step 903, user information of the recommended user is sent.

The user information of the above recommended user may include a user name, a user ID, a user avatar, and a user mailbox of the recommended user.

Optionally, the above method may be applied to a server.

In the above technical scheme, a source moving track sent by the movement information collection device is received. Based on the source moving track, a user that moves in at least one position of the multiple positions in the target time is searched for, and the user is taken as a recommended user. Then, user information of the recommended user is sent. Thus according to the embodiment, a user with a similar moving track may be recommended to the user.

Figure 10:
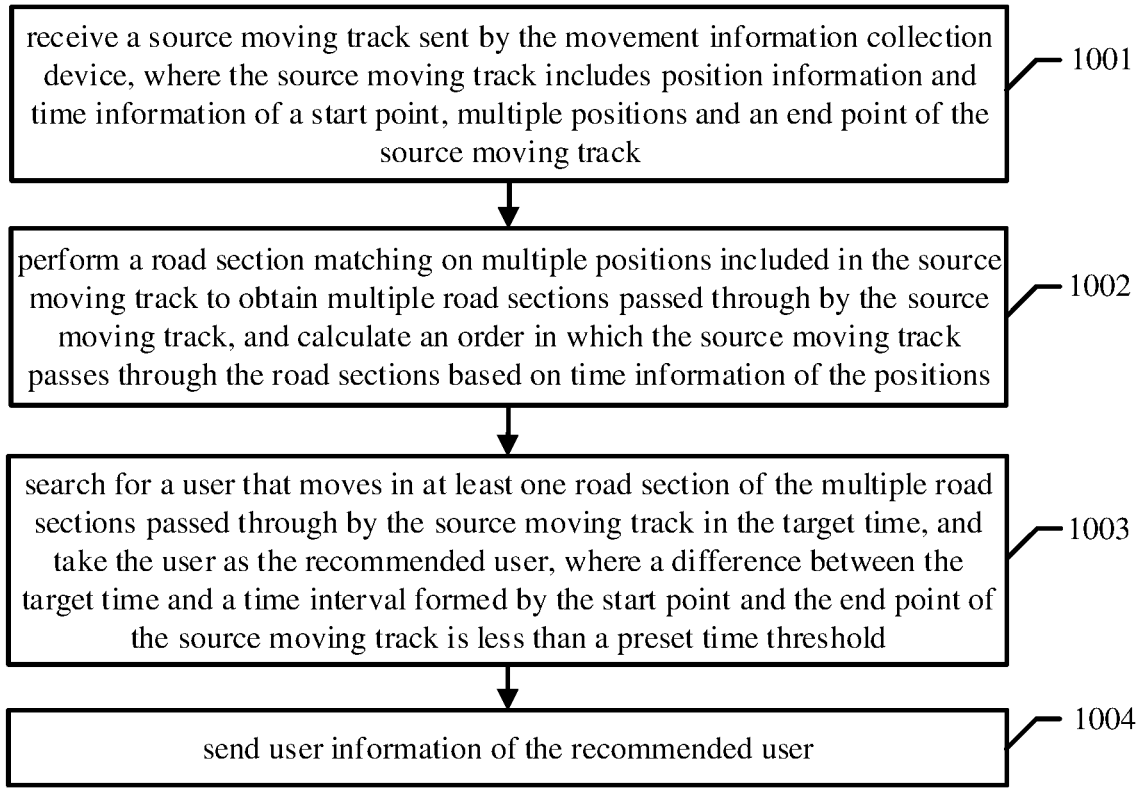
FIG. 10 is a flow chart of a data collection method according to an embodiment of the present disclosure.

Referring to FIG. 10, another data collection method according to an embodiment of the present disclosure is shown. As shown in FIG. 10, the method includes steps 1001 to 1004.

In step 1001, a source moving track sent by a spot information collection device is received. The source moving track includes position information and time information of a start point, multiple positions and an end point of the source moving track.

Optionally, during movement of the user, the above multiple positions may be obtained at equal time intervals. For example, position information and time information of the current position are obtained every 1 second or every 20 seconds. Alternatively during movement of the user, multiple positions may be obtained at equidistant intervals. For example, position information and time information of the current position are obtained every 10 meters or 50 meters. Alternatively during movement of the user, multiple positions may be obtained at random.

In step 1002, a road section matching is performed on multiple positions included in the source moving track, to obtain multiple road sections passed through by the source moving track. And an order in which the source moving track passes through the road sections is calculated based on time information of the positions.

Optionally, the method may specifically obtain a position included in a road section of a specific region, so that when the above multiple positions are obtained, a road section to which each position belongs may be determined. For example, for a province, positions included in all road sections of the province may be obtained. Certainly, the positions may be reference positions of the road sections, so that a moving track in the province may be quickly found. In addition, for each road section, a unique ID may be configured to identify a road section, that is, an ID corresponds to a road section, so that multiple road sections passed by a source moving track may be represented by multiple IDs. The above step of calculating an order in which the source moving track passes through each of the road sections, based on time information of each of the positions may be calculating a time interval in which the source moving track passes through each road section based on the time information of each position. Then an order in which the source moving track passes through each road section may be known through the time interval of each road section.

In step 1003, a user that moves in at least one road section of the multiple road sections passed through by the source moving track in the target time is searched for, and the user is taken as the recommended user. A difference between the target time and a time represented by the time information is less than a preset time threshold.

Before the step 1003 is performed, a moving track of other user which is similar to the above source moving track may be obtained in advance, then through a similar method of step 1002, road sections passed by each user and time for passing through each road section may be obtained. Thus in step 1003, the above recommended user may be searched for.

Optionally, the above recommended user may include at least one of a first user, a second user, a third user, a fourth user and a fifth user as follows.

The moving track of the first user in the target time coincides with the source moving track.

The moving track of the second user in the target time is a portion of the source moving track;

The moving track of the third user in the target time includes the source moving track.

The moving track of the fourth user in the target time has a partial same path as the source moving track, where the partial same path is a continuous path.

The moving track of the fifth user in the target time has a partial same path as the source moving track, where a start point of movement of the fifth user is the same as a start point of the source moving track, and the partial same path is a discontinuous path.

Optionally, the step 1003 may include:

determining whether the first user exists, and taking the first user as the recommended user if the first user exists;

determining whether the second user exists if the first user does not exist, and taking the second user as the recommended user if the second user exists;

determining whether the third user exists if neither of the first user and the second user exists, and taking the third user as the recommended user if the third user exists;

determining whether the fourth user exists if none of the first user, the second user and the third user exists, and taking the fourth user as the recommended user if the fourth user exists; and determining whether the fifth user exists if none of the first user, the second user, the third user and the fourth user exists, and taking the fifth user as the recommended user if the fifth user exists.

In the embodiment, the first user, the second user, the third user, and the fourth user may be searched for according to the priority, so as to preferentially recommend a user with a higher priority to the user.

In step 1004, user information of the recommended user is sent.

In the above technical scheme, multiple optional implementations are introduced based on the third embodiment, thus multiple users with a similar moving track may be recommended to the user.

Figure 11:
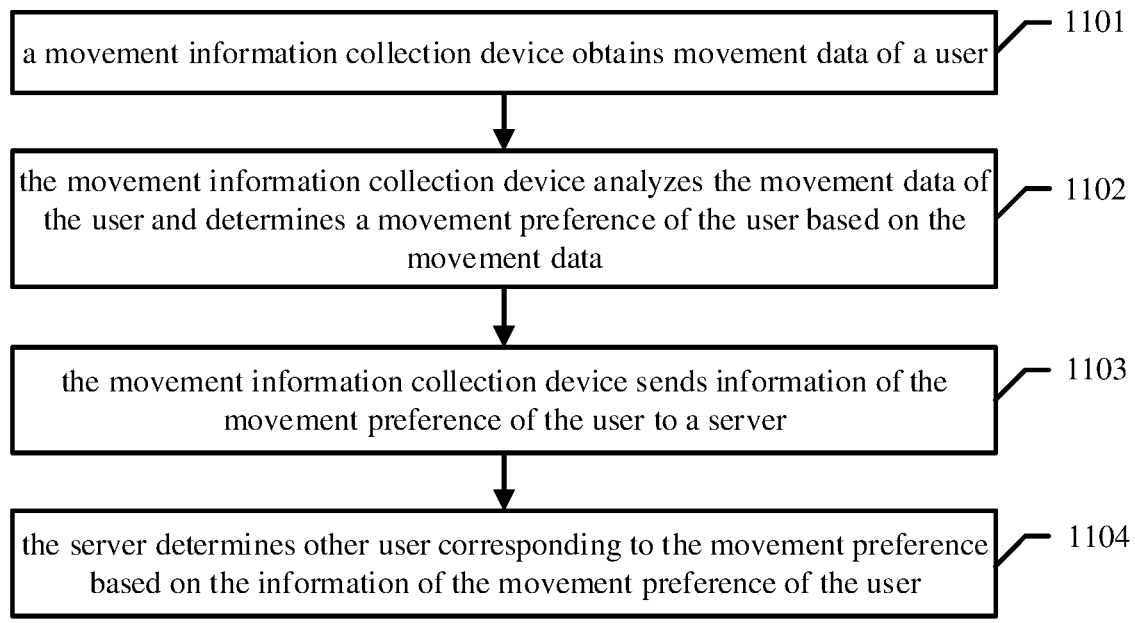
FIG. 11 is a flow chart of a data collection method according to an embodiment of the present disclosure.

The data collection method according to an embodiment of the present disclosure is described above. Hereinafter, a data processing method according to an embodiment of the present disclosure is described. Referring to FIG. 11, a data processing method according to an embodiment of the present disclosure includes steps 1101 to 1104.

In step 1101, a movement information collection device obtains movement data of a user.

In step 1102, the movement information collection device analyzes the movement data of the user, and determines a movement preference of the user based on the movement data.

In step 1103, the movement information collection device sends information of the movement preference of the user to a server.

In step 1104, based on the information of the movement preference of the user, the server determines other user corresponding to the movement preference.

First Embodiment

Figure 12:
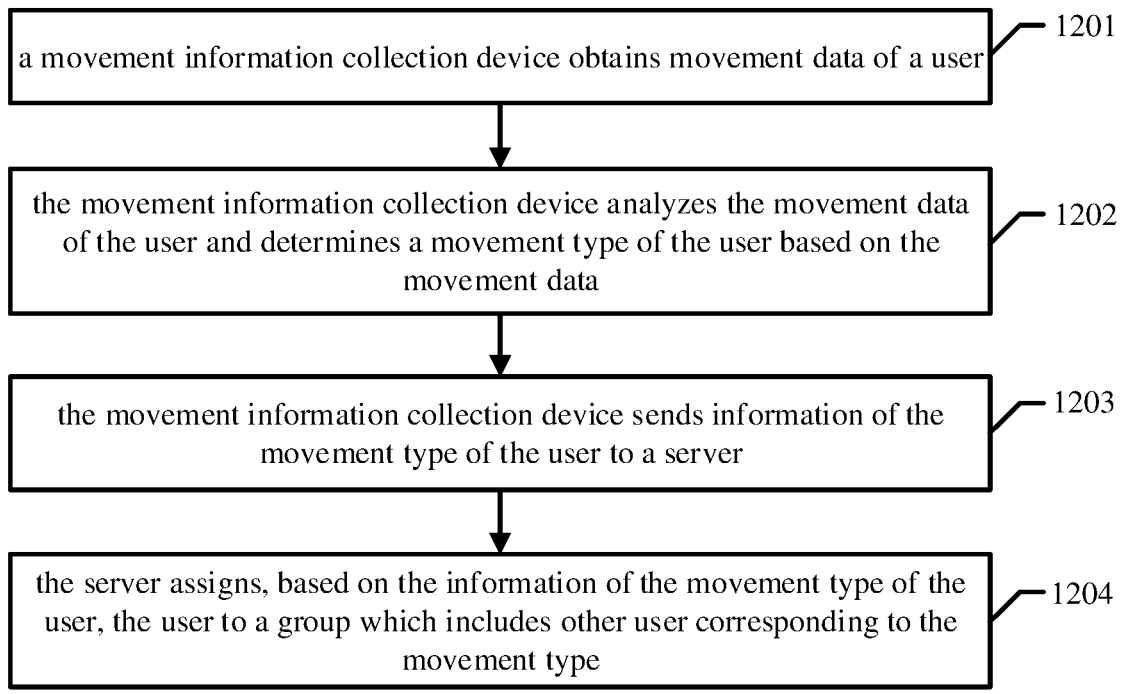
FIG. 12 is a flow chart of a data collection method according to an embodiment of the present disclosure.

Referring to FIG. 12, a data processing method according to an embodiment of the present disclosure includes steps 1201 to 1204.

In step 1201, a movement information collection device obtains movement data of a user.

In step 1202, the movement information collection device analyzes the movement data of the user, and determines a movement type of the user based on the movement data.

In step 1203, the movement information collection device sends information of the movement type of the user to a server.

In step 1204, based on the information of the movement type of the user, the server assigns the user to a group which includes other user corresponding to the movement type.

The embodiment corresponding to FIG. 12 may be understood by referring to the description of the embodiments corresponding to FIG. 2 and FIG. 8, which is not described in detail herein.

Second Embodiment

Figure 13:
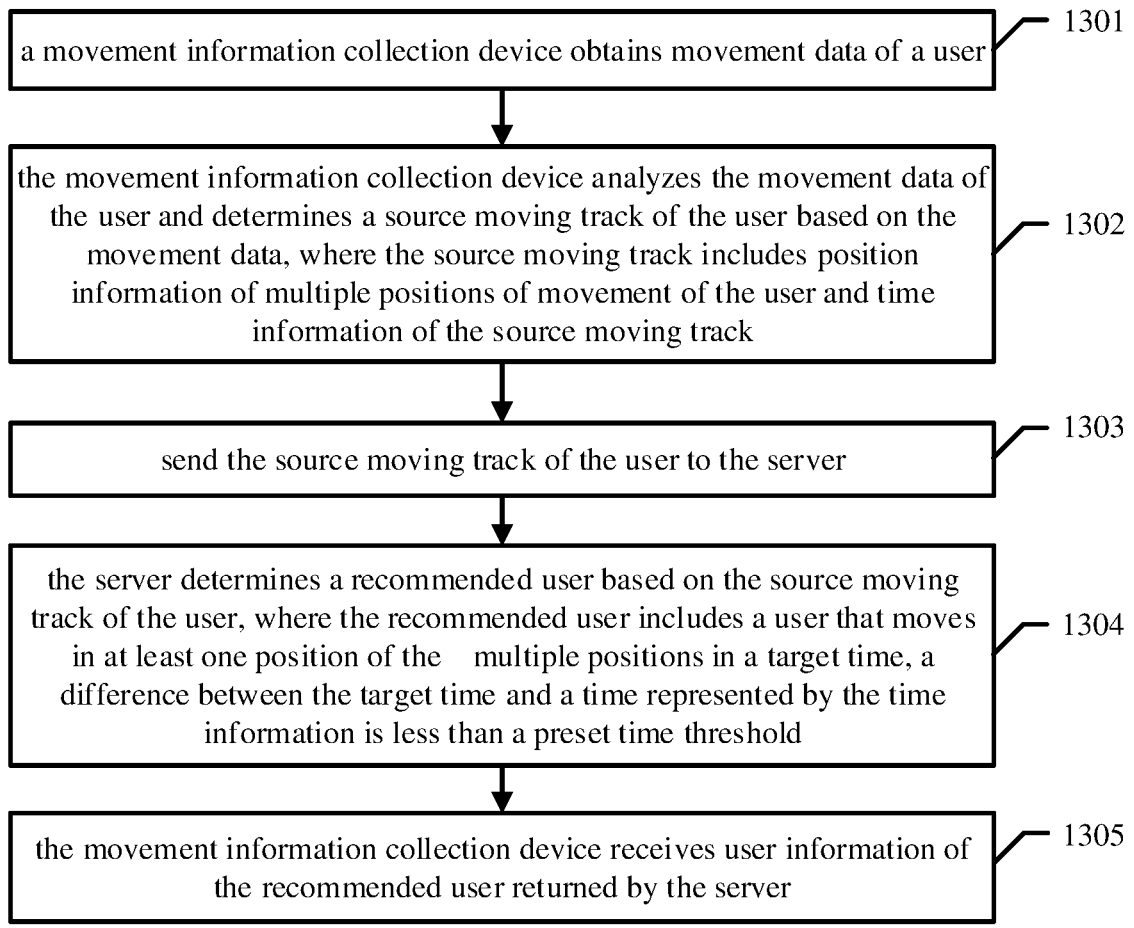
FIG. 13 is a flow chart of a data collection method according to an embodiment of the present disclosure.

Referring to FIG. 13, a data processing method according to an embodiment of the present disclosure includes steps 1301 to 1305.

In step 1301, a movement information collection device obtains movement data of a user.

In step 1302, the movement information collection device analyzes the movement data of the user, and determines a source moving track of the user based on the movement data. And the source moving track includes position information of multiple positions of movement of the user and time information of the source moving track.

In step 1303, the movement information collection device sends the source moving track of the user to a server.

In step 1304, the server searches for a user that moves in at least one position of the multiple positions in a target time based on the source moving track, and takes the user as a recommended user of the user terminal. A difference between the target time and a time represented by the time information is less than a preset time threshold.

In step 1305, the movement information collection device receives user information of the recommended user returned by the server.

Optionally, the step 1302 may include:

obtaining position information and time information of a start point when the user starts to move;

obtaining position information and time information of multiple positions during movement of the user;

obtaining position information and time information of an end point when the user stops moving; and generating the source moving track including the position information and the time information of the start point, the multiple positions and the end point.

Optionally, the step 1304 may include:

performing, by the server, a road section matching on multiple positions included in the source moving track to obtain multiple road sections passed through by the source moving track, and calculating an order in which the source moving track passes through the road sections, based on time information of the positions; and searching for a user that moves in at least one road section of the multiple road sections passed through by the source moving track in the target time, and taking the user as the recommended user.

It is noted that, for an implementation of the user terminal according to the embodiment, reference may be made to implementations of the embodiments shown in FIG. 4 and FIG. 5, and for an implementation of the server according to the embodiment, reference may be made to implementations of the embodiments shown in FIG. 9 and FIG. 10.

In the above technical scheme, the movement information collection device obtains a source moving track of a user, and the source moving track is sent to a server. Then, the server may search for a user that moves in at least one position of the multiple positions in a target time based on the source moving track. And the user is taken as a recommended user. Thus, the movement information collection device may receive user information of the recommended user returned by the server, so that a user with a similar moving track may be recommended to the user.

The data collection method and the data processing method according to embodiments of the present disclosure are described above. Hereinafter, a movement information collection device, a server and a movement information collection system according to embodiments of the present disclosure are respectively described.

Figure 14:
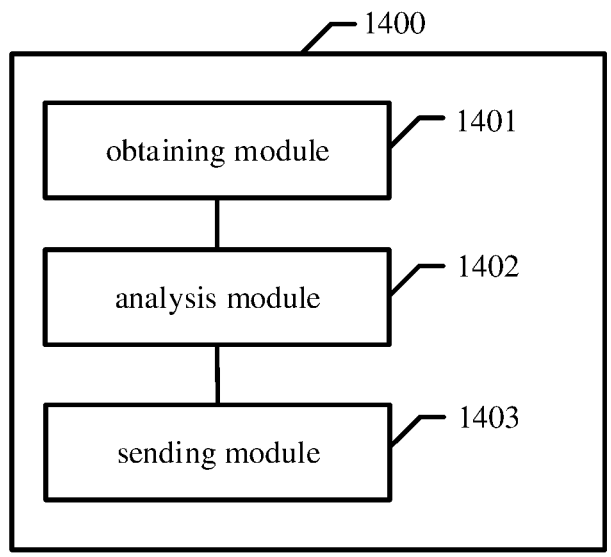
FIG. 14 is a schematic structural diagram of a movement information collection device according to an embodiment of the present disclosure.

Referring to FIG. 14, a movement information collection device 1400 according to an embodiment of the present disclosure includes an obtaining module 1401, an analysis module 1402 and a sending module 1403.

The obtaining module 1401 is configured to obtain movement data of a user.

The analysis module 1402 is configured to analyze the movement data of the user and determine a movement preference of the user based on the movement data.

The sending module 1403 is configured to send information of the movement preference of the user to a server such that the server determines, based on the information of the movement preference of the user, other user corresponding to the movement preference.

First Embodiment

Figure 15:
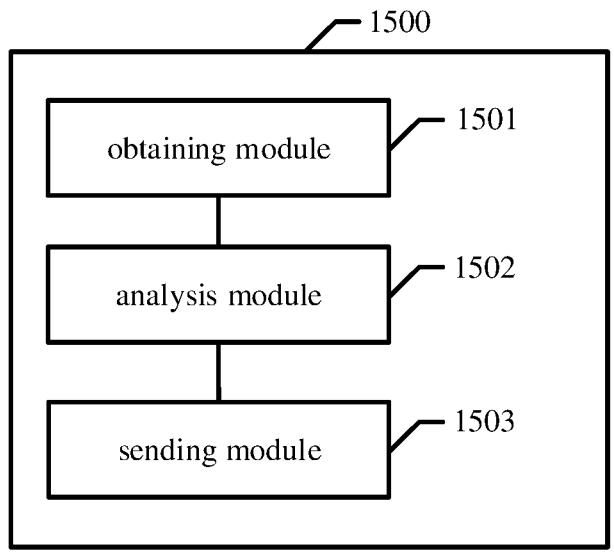
FIG. 15 is a schematic structural diagram of a movement information collection device according to an embodiment of the present disclosure.

Referring to FIG. 15, a movement information collection device 1500 according to an embodiment of the present disclosure includes an obtaining module 1501, an analysis module 1502 and a sending module 1503.

The obtaining module 1501 is configured to obtain movement data of a user.

The analysis module 1502 is configured to analyze the movement data of the user and determine a movement type of the user based on the movement data.

The sending module 1503 is configured to send information of the movement type of the user to the server such that the server assigns, based on the information of the movement type of the user, the user to a group which includes other user corresponding to the movement type.

In the embodiment, the movement information collection device analyzes collected movement data of a user, determines the movement type of the user based on the movement data, and sends the information of the movement type to the server, so that the server assigns the user to a group corresponding to the movement type based on the information of the movement type of the user. In this way, a series of cumbersome processes, such as a process for the user to enter his preference when logging into the social account, etc., are avoided. The user preference can be obtained automatically, and the user preference analyzed by the movement information collection device based on the collected data can fit real situation of the user.

Specifically, in the embodiment, the movement information collection device may be any device capable of collecting user movement information. In the embodiment, the movement information collection device may be a wearable device, such as a smart watch, a smart bracelet, and a smart phone, which is not limited herein.

Optionally, based on the embodiment shown in FIG. 15, the obtaining module 1501 is further configured to obtain a movement position and/or a movement time of the user.

The sending module 1503 is further configured to send the movement position and/or the movement time to the server such that the server assigns, based on the movement position and/or the movement time, the user to a group which includes other user corresponding to the movement position and/or the movement time.

Optionally, based on the embodiment shown in FIG. 15, the obtaining module 1501 specifically includes an acceleration sensor, which is configured to detect a movement speed of the user.

The analysis module 1502 is specifically configured to determine that the user is jogging in a case of detecting that the movement speed of the user in a first preset time period is greater than a first preset value.

Optionally, based on the embodiment shown in FIG. 15, the obtaining module 1501 specifically includes a gyroscope, which is configured to detect a swing angle of the user.

The analysis module 1502 is specifically configured to determine that the user is playing a ball game in a case of detecting that the swing angle of the user in a second preset time period is greater than a second preset value.

Figure 16:
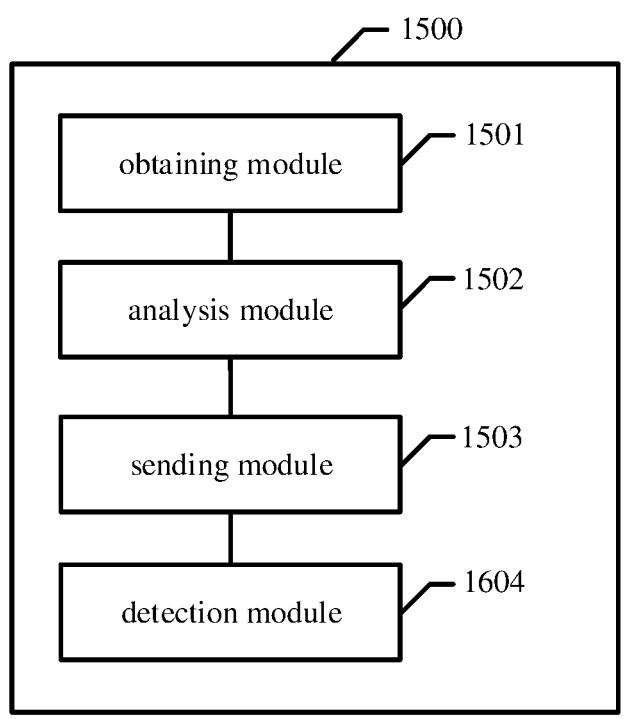
FIG. 16 is a schematic structural diagram of a movement information collection device according to an embodiment of the present disclosure.

Optionally, based on the embodiment shown in FIG. 15, referring to FIG. 16, in another embodiment of the movement information collection device according to the present disclosure, the movement information collection device further includes a detection module 1604.

The detection module 1604 is configured to detect a number of times that the movement data of the user meets a preset condition in a preset period.

The analysis module 1502 is specifically configured for the movement information collection device to determine the movement type of the user as a movement type corresponding to the preset condition in a case of detecting that the number of times reaches a third preset value.

Second Embodiment

Figure 17:
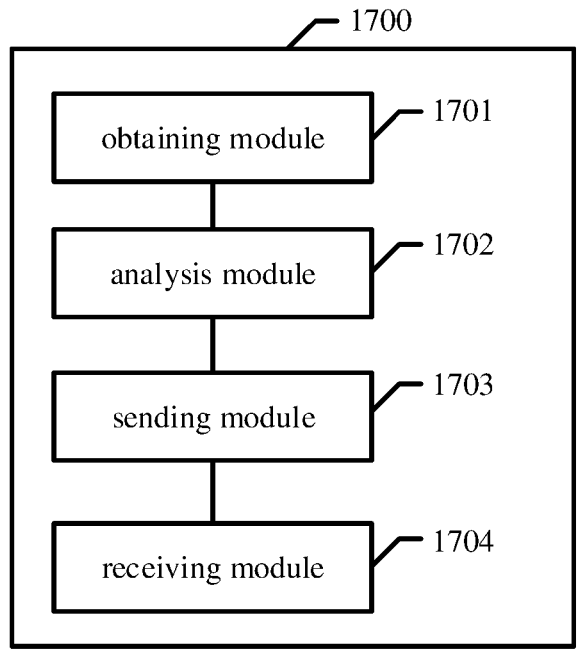
FIG. 17 is a schematic structural diagram of a movement information collection device according to an embodiment of the present disclosure.

Referring to FIG. 17, another movement information collection device according to another embodiment of the present disclosure is shown in FIG. 17. As shown in FIG. 17, the movement information collection device includes an obtaining module 1701, an analysis module 1702, a sending module 1703 and a receiving module 1704.

The obtaining module 1701 is configured to obtain movement data of a user.

The analysis module 1702 is configured to analyze the movement data of the user and determine a source moving track of the user based on the movement data. And the source moving track includes position information of multiple positions of movement of the user and time information of the source moving track.

The sending module 1703 is configured to send the source moving track of the user to the server such that the server determines a recommended user based on the source moving track of the user.

The receiving module 1704 is configured to receive user information of the recommended user returned by the server. The recommended user includes a user that moves in at least one position of the multiple positions in a target time, and a difference between the target time and a time represented by the time information is less than a preset time threshold.

Figure 18:
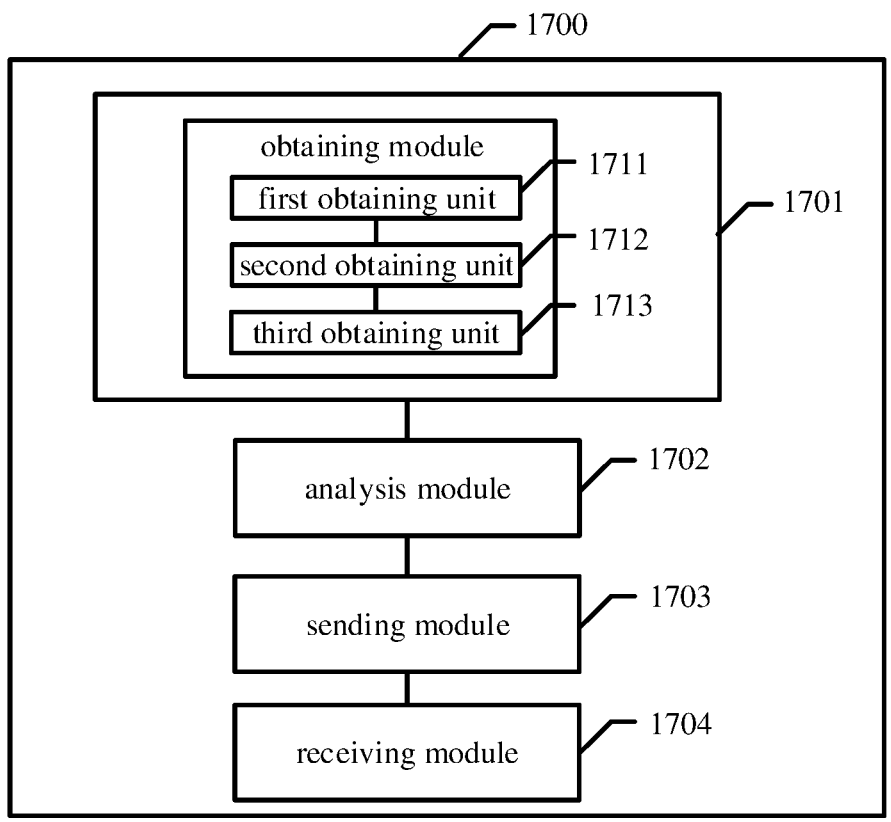
FIG. 18 is a schematic structural diagram of a movement information collection device according to an embodiment of the present disclosure.

In another embodiment, referring to FIG. 18, the obtaining module may include a first obtaining unit 1711, a second obtaining unit 1712 and a third obtaining unit 1713.

The first obtaining unit 1711 is configured to obtain position information and time information of a start point when the user starts to move.

The second obtaining unit 1712 is configured to obtain position information and time position of multiple positions during movement of the user.

The third obtaining unit 1713 is configured to obtain position information and time position of an end point when the user stops moving.

The analysis module 1702 is configured to generate a source moving track including the position information and the time information of the start point, the multiple positions and the end point.

In the embodiment, the analysis module 1702 may include a rarefying unit and a generating unit.

The rarefying unit is configured to determine whether a specific path exists in a path of the movement of the user based on the position information and the time position of the multiple positions. And if so, a rarefying operation is performed on several positions located in the specific path among the multiple positions to obtain multiple rarefying positions.

The generating unit is configured to generate a source moving track including position information and time information of the start point, multiple non-rarefying positions, the multiple rarefying positions and the end point. The multiple non-rarefying positions are several positions which are not located in the specific path among the multiple positions.

Optionally, the above specific path may include at least one of:

a congested path and a straight path.

In the embodiment, a rarefying operation is performed on multiple positions located in the specific path, so that the number of positions in the source moving track may be reduced, the computation cost is reduced, and the network traffic is saved.

Optionally, the above recommended user may include a user that moves in at least one road section of multiple road sections passed through by the source moving track in a target time.

A difference between the target time and a time interval formed by the start point and the end point of the source moving track is less than a preset time threshold. The multiple road sections passed through by the source moving track are obtained by the server performing a road section matching on multiple positions included in the source moving track. The server further calculates an order in which the source moving track passes through the road sections, based on time information of the positions.

Further, the recommender user may include at least one of a first user, a second user, a third user, a fourth user and a fifth user.

The moving track of the first user in the target time coincides with the source moving track.

The moving track of the second user in the target time is a portion of the source moving track.

The moving track of the third user in the target time includes the source moving track.

The moving track of the fourth user in the target time has a partial same path as the source moving track, where the partial same path is a continuous path.

The moving track of the fifth user in the target time has a partial same path as the source moving track, where a start point of movement of the fifth user is the same as a start point of the source moving track, and the partial same path is a discontinuous path.

Optionally, the above device may be applied to a user terminal.

Optionally, the device may also add the above recommended user as a user based on the above user information. In addition, in the embodiment, the above recommended user may be one or more users.

In the above technical scheme, a source moving track of a user is obtained, and the source moving track is sent to a server. Then, the server may determine a recommended user based on the source moving track. Thus, user information of the recommended user returned by the server is received, and the recommended user includes a user that moves in at least one position of the multiple positions in a target time. A difference between the target time and a time represented by the time information is less than a preset time threshold. Therefore, with this embodiment, a user who has a similar moving track with the user may be recommended to the user.

Figure 19:
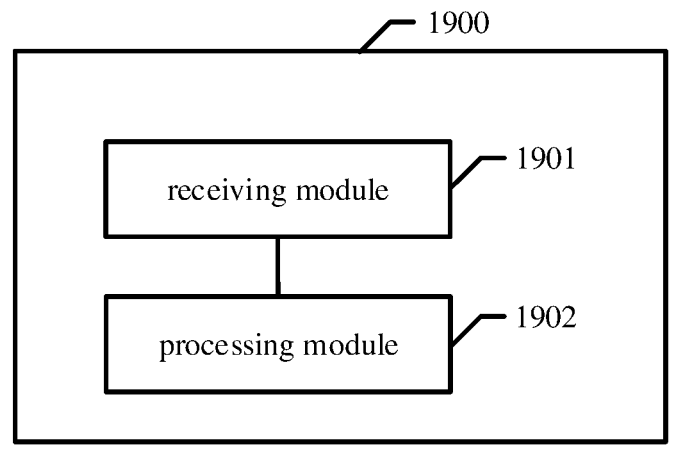
FIG. 19 is a schematic structural diagram of a server according to an embodiment of the present disclosure.

Referring to FIG. 19, a server 1900 according an embodiment of the present disclosure includes a receiving module 1901 and a processing module 1902.

The receiving module 1901 is configured to receive information of a movement preference of a user sent by a movement information collection device.

The processing module 1902 is configured to determine other user corresponding to the movement preference based on the information of the movement preference of the user.

First Embodiment

Figure 20:
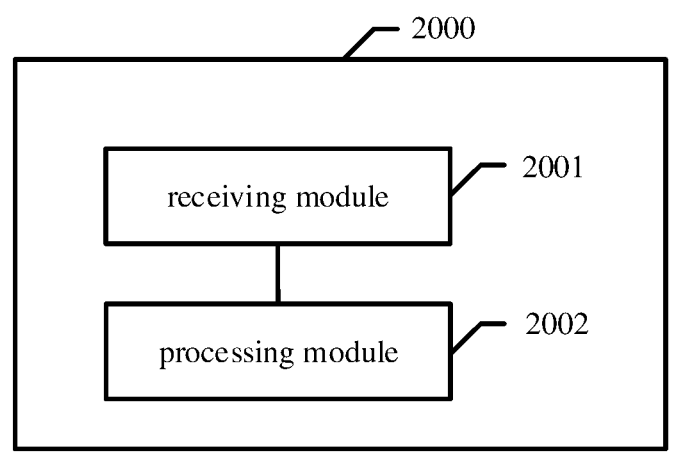
FIG. 20 is a schematic structural diagram of a server according to an embodiment of the present disclosure.

Referring to FIG. 20, a server 2000 according to an embodiment of the present disclosure includes a receiving module 2001 and a processing module 2002.

The receiving module 2001 is configured to receive information of the movement type of the user sent by the movement information collection device.

The processing module 2002 is configured to assign the user to a group including other user corresponding to the movement type, based on the information of the movement type of the user.

Second Embodiment

Figure 21:
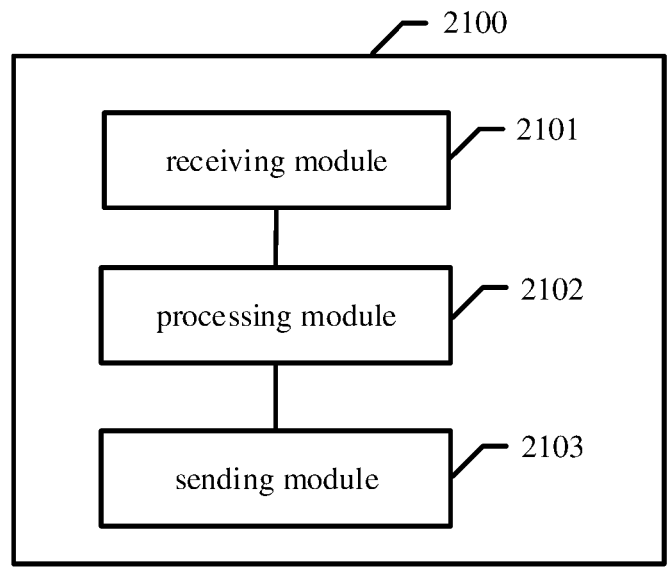
FIG. 21 is a schematic structural diagram of a server according to an embodiment of the present disclosure.

Referring to FIG. 21, another server according to an embodiment of the present disclosure is shown. As shown in FIG. 21, the server includes a receiving module 2101, a processing module 2102 and a sending unit 2103.

The receiving module 2101 is configured to receive a source moving track of the user. The source moving track includes position information of multiple of positions of movement of the user and time information of the source moving track.

The processing module 2102 is configured to search for a user that moves in at least one position of the multiple positions in a target time based on the source moving track, and take the user as a recommended user. A difference between the target time and a time represented by the time information is less than a preset time threshold.

The sending module 2103 is configured to send user information of the recommended user.

As another embodiment, the above source moving track may include a source moving track having position information and time information of a start point, multiple positions and an end point of the source moving track.

A difference between the target time and a time interval formed by the start point and the end point of the source moving track is less than a preset time threshold.

Figure 22:
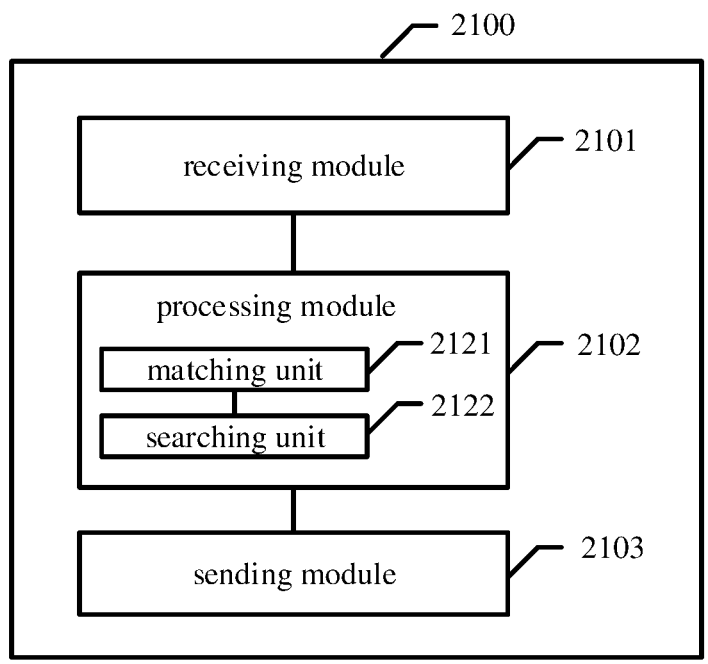
FIG. 22 is a schematic structural diagram of a server according to an embodiment of the present disclosure.

In the embodiment, as shown in FIG. 22, the processing module 2102 may include a matching unit 2121 and a searching unit 2122.

The matching unit 2121 is configured to perform a road section matching on multiple positions included in the source moving track to obtain multiple road sections passed through by the source moving track, and calculate an order in which the source moving track passes through each of the road sections, based on time information of each of the positions.

The searching unit 2122 is configured to search for a user that moves in at least one road section of the multiple road sections passed through by the source moving track in the target time, and take the user as the recommended user.

Optionally, the above recommended user may include at least one of a first user, a second user, a third user, a fourth user and a fifth user.

The moving track of the first user in the target time coincides with the source moving track.

The moving track of the second user in the target time is a portion of the source moving track.

The moving track of the third user in the target time includes the source moving track.

The moving track of the fourth user in the target time has a partial same path as the source moving track, where the partial same path is a continuous path.

The moving track of the fifth user in the target time has a partial same path as the source moving track, where a start point of movement of the fifth user is the same as a start point of the source moving track, and the partial same path is a discontinuous path.

Figure 23:
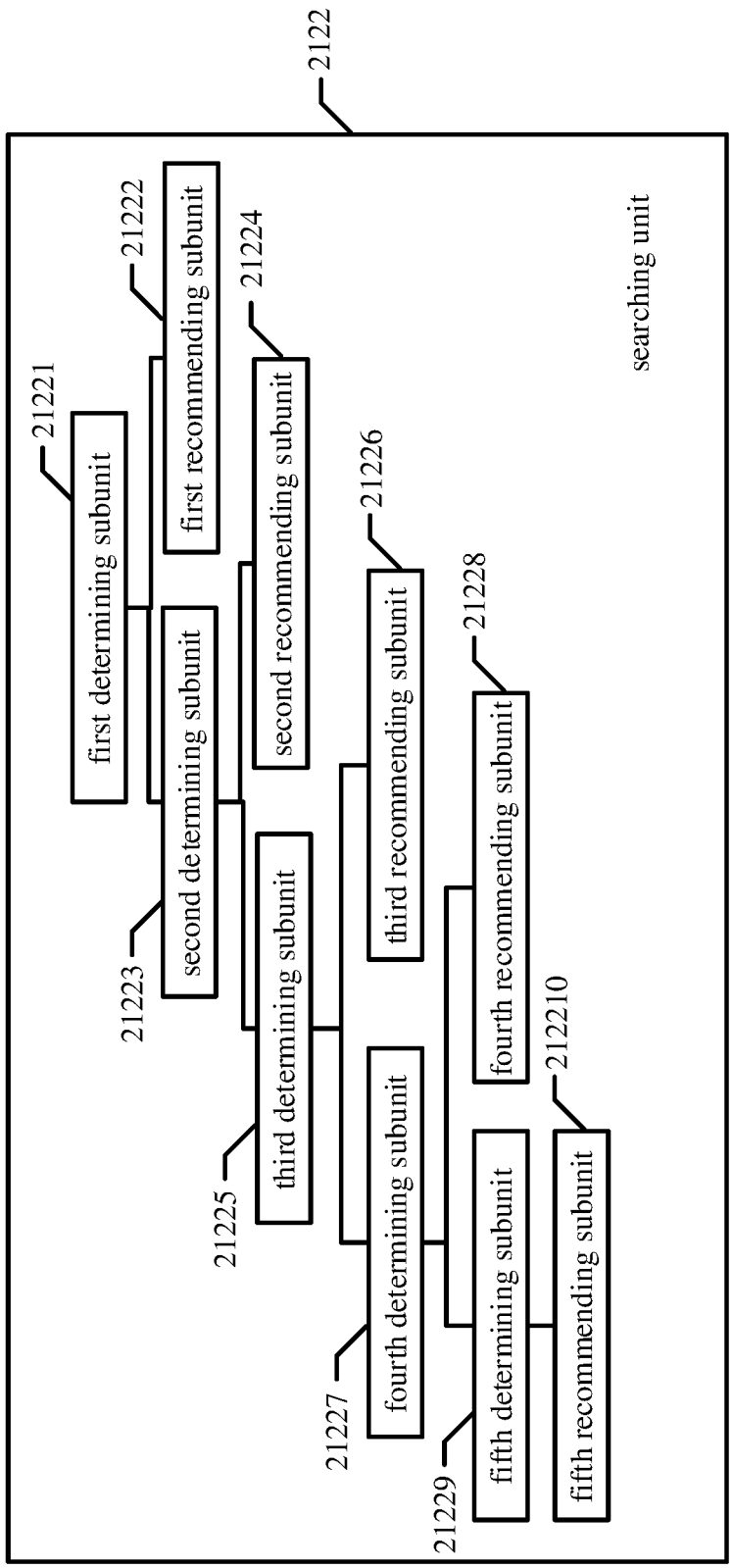
FIG. 23 is a schematic structural diagram of a searching unit of a server according to an embodiment of the present disclosure.

As another embodiment, as shown in FIG. 23, the searching unit may include a first determining subunit 21221, a first recommending subunit 21222, a second determining subunit 21223, a second recommending subunit 21224, a third determining subunit 21225, a third recommending subunit 21226, a fourth determining subunit 21227, a fourth recommending subunit 21228, a fifth determining subunit 21229, a fifth recommending subunit 212210.

The first determining subunit 21221 is configured to determine whether the first user exists.

The first recommending subunit 21222 is configured to take the first user as the recommended user if the first determining subunit 21221 determines that the first user exists.

The second determining subunit 21223 is configured to determine whether the second user exists if the first determining subunit 21221 determines that the first user does not exist.

The second recommending subunit 21224 is configured to take the second user as the recommended user if the second determining subunit 21223 determines that the second user exists.

The third determining subunit 21225 is configured to determine whether the third user exists if the second determining subunit 21223 determines that the second user does not exist.

The third recommending subunit 21226 is configured to take the third user as the recommended user if the third determining subunit 21225 determines that the third user exists.

The fourth determining subunit 21227 is configured to determine whether the fourth user exists if the third determining subunit 21225 determines that the third user does not exist.

The fourth recommending subunit 21228 is configured to take the fourth user as the recommended user if the fourth determining subunit 21227 determines that the fourth user exists.

The fifth determining subunit 21229 is configured to determine whether the fifth user exists if the fourth determining subunit 21227 determines that the fourth user does not exist.

The fifth recommending subunit 212210 is configured to take the fifth user as the recommended user if the fifth determining subunit 21229 determines that the fifth user exists.

In the embodiment, the first user, the second user, the third user, and the fourth user may be searched for according to the priority, so as to preferentially recommend a user with a higher priority to the user.

Optionally, the above device may be applied to a server.

In the above technical scheme, a source moving track is received. Then based on the source moving track, a user that moves in at least one position of the multiple positions in a target time is searched for, and the user is taken as a recommended user. Finally, user information of the recommended user is sent. Thus according to the embodiment, a user having a similar moving track may be recommended to the user.

The movement information collection device and the server according to an embodiment of the present disclosure are described above. Hereinafter, a movement information collection system according to an embodiment of the present disclosure is described.

Figure 24:
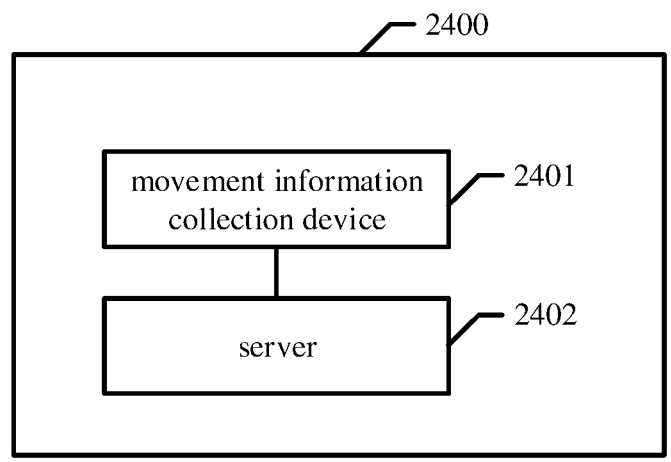
FIG. 24 is a schematic structural diagram of a movement information collection system according to an embodiment of the present disclosure.

Referring to FIG. 24, the movement information collection system 2400 according to an embodiment of the present disclosure includes:

a movement information collection device 2401 and a server 2402.

For a description of the movement information collection device 2401, reference may be made to description of the embodiments corresponding to FIGS. 14 to 18 or optional embodiments, and for a description of the server 2402, reference may be made to description of the embodiments corresponding to FIGS. 19 to 23, which are not described in detail herein.

It is to be known clearly by those skilled in the art that, for convenient and clear description, reference may be made to the corresponding process in the above method embodiment for specific operation processes of the above system, device and unit, which is not described herein.

Figure 25:
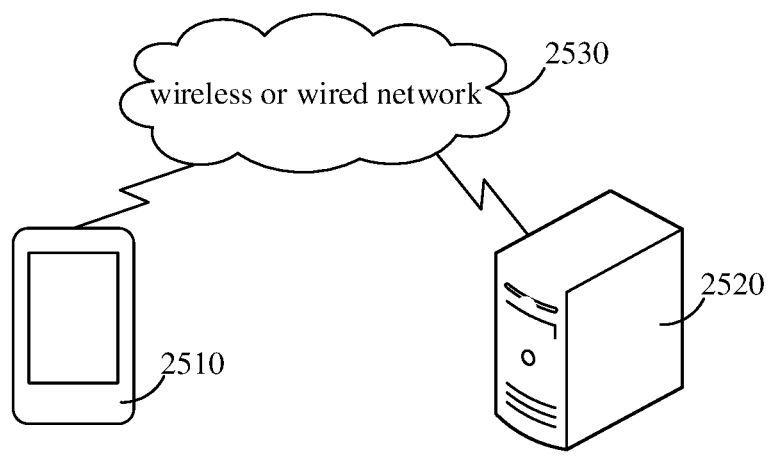
FIG. 25 is a schematic diagram of an application environment of a data processing method according to an embodiment of the present disclosure.

Referring to FIG. 25, a schematic diagram of an application environment of a data processing method according to an embodiment of the present disclosure is shown. As shown in FIG. 25, a movement information collection device 2510 and a server 2520 are located in a wireless or wired network 2530. Through the wireless or wired network 2530, the movement information collection device 2510 and the server 2520 communicate with each other.

Figure 26:
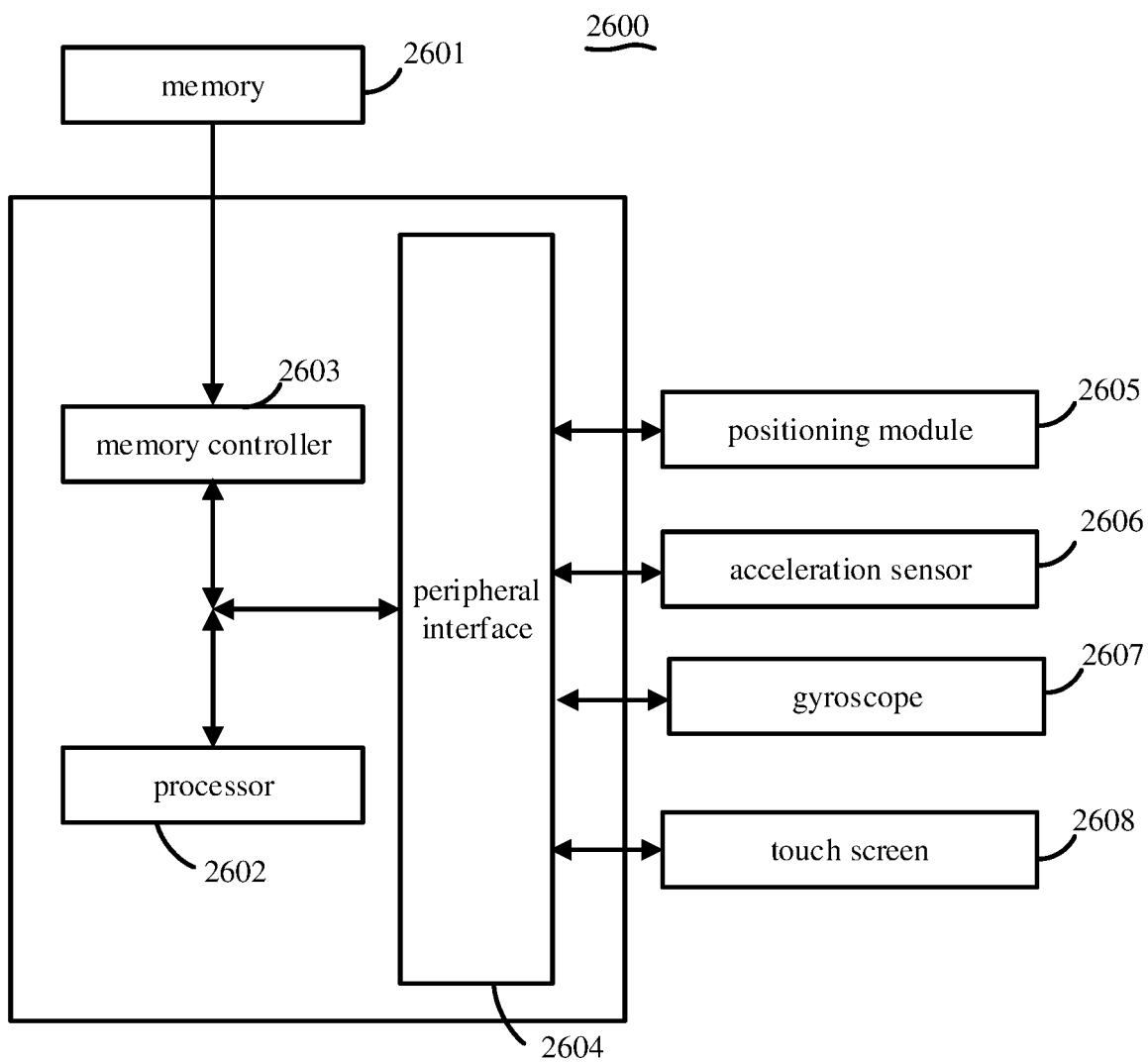
FIG. 26 is a schematic diagram of an application environment of a data collection method according to an embodiment of the present disclosure.

Referring to FIG. 26, a schematic diagram of an application environment of a data collection method according to an embodiment of the present disclosure is shown. As shown in FIG. 26, a movement information collection device 2600 includes a memory 2601, a memory controller 2603, one or more (only one is shown in the figure) processors 2602, a peripheral interface 2604, a positioning module 2605, an acceleration sensor 2606, a gyroscope 2607, and a touch screen 2608. These components communicate with each other through one or more communication buses/signal lines.

It is to be understood that the structure shown in FIG. 26 is only illustrative, and the movement information collection device 2600 may also include more or fewer components than those shown in FIG. 26, or may have a different configuration with that shown in FIG. 26. The components shown in FIG. 26 may be implemented in hardware, software, or a combination thereof.

The memory 2601 may be configured to store a software program and a module, such as a program instruction/a module corresponding to the data collection method and device in the movement information collection device according to the embodiments of the present disclosure. Through executing the software program and the module stored in the memory 2601, the processor 2602 executes various functional applications and data processing, that is, a data collection method is realized in the above movement information collection device.

The memory 2601 may include a high speed random access memory, and may also include a non-volatile memory, such as one or more magnetic storage devices, a flash memory, or other non-volatile solid state memory. In some embodiments, the memory 2601 may further include a memory configured remotely to the processor 2602. The remote memory may be connected to the movement information collection device 2600 through a network. Examples of the above networks include, but are not limited to, the Internet, an intranet, a local area network, a mobile communication network and combinations thereof. An access to the memory 2601 by the processor 2602 and other possible components may be performed under the control of the memory controller 2603.

The peripheral interface 2604 couples various input/input devices to the CPU and the memory 2601. The processor 2602 runs various software and instructions in the memory 2601, to execute various functions of the movement information collection device 2600.

In some embodiments, the peripheral interface 2604, the processor 2602, and the memory controller 2601 may be implemented in a single chip. In other embodiments, they may be implemented separately in separate chips.

The positioning module 2605 is configured to acquire a current location of the movement information collection device 2600. Examples of the positioning module 2605 include, but are not limited to, a global positioning system (GPS), a positioning technique based on a wireless local area network or a mobile communication network.

The acceleration sensor 2606 is an instrument for measuring acceleration. The acceleration sensor 2606 may be configured to measure the speed of the user when the movement information collection device 2600 is worn on the user body.

The gyroscope 2607 is an instrument for measuring an angular motion. The gyroscope 2607 may be configured to measure a swing angle of the user when the movement information collection device 2600 is worn on the user body.

The touch screen 2608 provides an output and input interface between the movement information collection device 2600 and the user. Specifically, the touch screen 2608 displays a video output to the user, the content of which may include a text, a picture, a video, and any combination thereof. Some of the output results correspond to some user interface objects. The touch screen 2608 also receives a user input, such as a gesture operation of a click, a slide of a user, so that the user interface objects respond to the user input. Techniques for detecting a user input may be techniques based on resistive, capacitive, or any other possible touch detection. Specific examples of a display unit of the touch screen 2608 include, but are not limited to, a liquid crystal display or a light emitting polymer display.

In an embodiment of the present disclosure, the processor 2602 included in the movement information collection device 2600 may execute program instructions stored in the memory 2601, to perform the following functions:

obtaining movement data of a user;

analyzing the movement data of the user and determining a movement preference of the user based on the movement data; and sending information of the movement preference of the user to a server such that the server determines other user corresponding to the movement preference based on the information of the movement preference of the user.

Optionally, the above analyzing the movement data of the user and determining a movement preference of the user based on the movement data includes:

analyzing the movement data of the user and determining a movement type of the user based on the movement data.

The sending information of the movement preference of the user to a server such that the server determines other user corresponding to the movement preference based on the information of the movement preference of the user includes:

sending information of the movement type of the user to the server such that the server assigns the user to a group including other user corresponding to the movement type, based on the information of the movement type of the user.

Optionally, the above analyzing the movement data of the user and determining a movement preference of the user based on the movement data includes:

analyzing the movement data of the user, and determining a source moving track of the user based on the movement data, where the source moving track includes position information of a plurality of positions of movement of the user and time information of the source moving track.

The sending information of the movement preference of the user to a server such that the server determines other user corresponding to the movement preference based on the information of the movement preference of the user includes:

sending the source moving track of the user to the server such that the server determines a recommended user based on the source moving track of the user, where the recommended user includes a user that moves in at least one position of the multiple positions in a target time, and a difference between the target time and a time represented by the time information is less than a preset time threshold.

Optionally, the functions further include:

obtaining a movement position and/or a movement time of the user; and sending the movement position and/or the movement time to the server such that the server assigns the user to a group including other user corresponding to the movement position and/or the movement time, based on the movement position and/or the movement time.

In the embodiments mentioned in the disclosure, it is to be understood that, the disclosed system, device and method may be implemented in other ways. For example, the above device embodiment is only illustrative. For example, the division of the units is only a logical functional division. In practice, there may be other divisions. For example, multiple units or assembles may be combined or may be integrated into another system. Alternatively, some features may be neglected or not be performed. The illustrated or discussed mutual coupling or direct coupling or communication connection may be an indirect coupling or communication connection via some interfaces, devices or units, which may be in an electrical, mechanical or other form.

The units described as separate components may be or may not be separate physically, and the components which are illustrated as units may be or may not be physical units, that is, may be located at a same position, or may be distributed over multiple network units. Some or all of the units may be selected as required to implement the solution of the embodiment.

Further, the functional units in the embodiments of the disclosure may be integrated into one processing unit, or may exist physically separately. Alternatively, two or more of the functional units may be integrated into one unit. The above integrated unit may be implemented in hardware, or may also be implemented as a software functional unit.

When being implemented as a software functional unit and being sold and used as a separate product, the integrated unit may be stored in a computer readable storage medium. Based on this, an essential part or a part contributing to the prior art of the technical solution of the disclosure or the whole or a part of the technical solution may be embodied in a software product which is stored in a storage medium, including several instructions for causing a computer device (which may be a personal computer, a server, a network device or the like) to perform all or some of the steps of the method in the embodiment of the disclosure. The above storage medium includes various mediums capable of storing program code, such as a U disk, a movable disk, a Read-Only Memory (ROM, Read-Only Memory), a Random Access Memory (RAM, Random Access Memory), a magnetic disk or an optical disk.

As described above, the above embodiments are only intended to describe the technical solutions of the disclosure, but not to limit the scope of the disclosure. Although the disclosure is described in detail with reference to the above embodiments, it should be understood by those ordinal skilled in the art that modifications can be made to the technical solutions recorded in the above embodiments or equivalent replacements can be made to some or all of the technical features thereof, which modifications and equivalent replacements will not make the corresponding technical solutions deviate from the scope of the technical solutions of the embodiments of the disclosure.

The invention claimed is:

1. A data collection method, comprising:
   in a movement information collection device,
   obtaining movement data of a user;
   analyzing the movement data of the user and determining a movement preference of the user based on the movement data; and
   sending information of the movement preference of the user to a server such that the server determines, based on the information of the movement preference of the user, other user corresponding to the movement preference.

2. The data collection method according to claim 1, wherein,
   the analyzing the movement data of the user and determining a movement preference of the user based on the movement data comprises:
   analyzing the movement data of the user and determining a movement type of the user based on the movement data; and
   the sending information of the movement preference of the user to a server such that the server determines, based on the information of the movement preference of the user, other user corresponding to the movement preference comprises:
   sending information of the movement type of the user to the server such that the server assigns, based on the information of the movement type of the user, the user to a group which comprises other user corresponding to the movement type.

3. The data collection method according to claim 2, wherein the method further comprises:
   obtaining a movement position and/or a movement time of the user; and
   sending the movement position and/or the movement time to the server such that the server assigns, based on the movement position and/or the movement time, the user to a group which comprises other user corresponding to the movement position and/or the movement time.

4. The data collection method according to claim 2, wherein,
   an acceleration sensor is arranged in the movement information collection device;
   the obtaining the movement data of the user comprises:
   detecting, by the acceleration sensor, a movement speed of the user; and
   the analyzing the movement data of the user and determining the movement type of the user based on the movement data comprises:
   determining the movement type of the user as jogging, in a case of detecting that the movement speed of the user in a first preset time period is greater than a first preset value.

5. The data collection method according to claim 2, wherein,
   a gyroscope is arranged in the movement information collection device;
   the obtaining the movement data of the user comprises:
   detecting, by the gyroscope, a swing angle of the user; and
   the analyzing the movement data of the user and determining the movement type of the user based on the movement data comprises:
   determining the movement type of the user as a ball game, in a case of detecting that the swing angle of the user in a second preset time period is greater than a second preset value.

6. The data collection method according to claim 2, wherein the analyzing the movement data of the user and determining a movement type of the user based on the movement data comprises:
   detecting a number of times that the movement data of the user meets a preset condition in a preset time period; and
   determining the movement type of the user as a movement type corresponding to the preset condition, in a case of detecting that the number of times reaches a third preset value.

7. The data collection method according to claim 1, wherein,
   the analyzing the movement data of the user and determining a movement preference of the user based on the movement data comprises:

analyzing the movement data of the user, and determining a source moving track of the user based on the movement data, wherein the source moving track comprises position information of a plurality of positions of movement of the user and time information of the source moving track;

the sending information of the movement preference of the user to a server such that the server determines, based on the information of the movement preference of the user, other user corresponding to the movement preference comprises:

sending the source moving track of the user to the server such that the server determine a recommended user based on the source moving track of the user, wherein the recommended user comprises a user that moves in at least one position of the plurality of positions in a target time, and a difference between the target time and a time represented by the time information is less than a preset time threshold; and the method further comprises:

receiving user information of the recommended user returned by the server.

8. The data collection method according to claim 7, wherein the determining the source moving track of the user comprises:

obtaining position information and time information of a start point when the user starts to move;

obtaining position information and time information of a plurality of positions during movement of the user;

obtaining position information and time information of an end point when the user stops moving; and generating the source moving track comprising the position information and the time information of the start point, the plurality of positions and the end point.

9. The data collection method according to claim 8, wherein the generating the source moving track comprising the position information and the time position of the start point, the plurality of positions and the end point comprises:

determining whether a specific path exists in a path of the movement of the user based on the position information and the time position of the plurality of positions, and if the specific path exists in the path of the movement of the user, performing a rarefying operation on several positions located in the specific path among the plurality of positions to obtain a plurality of rarefying positions; and generating a source moving track comprising position information and time information of the start point, a plurality of non-rarefying positions, the plurality of rarefying positions and the end point, wherein the plurality of non-rarefying positions are several positions which are not located in the specific path among the plurality of positions.

10. The data collection method according to claim 9, wherein the specific path comprises at least one of a congested path and a straight path.

11. The data collection method according to claim 7, wherein the recommended user comprises: a user that moves in at least one road section of a plurality of road sections passed through by the source moving track in the target time, wherein, a difference between the target time and a time interval formed by the start point and the end point of the source moving track is less than a preset time threshold;

a plurality of road sections passed through by the source moving track are obtained by the server performing a road section matching on the plurality of positions comprised in the source moving track; and the server further calculates an order in which the source moving track passes through the road sections, based on time information of the positions.

12. The data collection method according to claim 11, wherein the recommended user comprises at least one of:

a first user whose moving track in the target time coincides with the source moving track;

a second user whose moving track in the target time is a portion of the source moving track;

a third user whose moving track in the target time comprises the source moving track;

a fourth user whose moving track in the target time has a partial same path as the source moving track, wherein the partial same path is a continuous path; and a fifth user whose moving track in the target time has a partial same path as the source moving track, wherein a start point of movement of the fifth user is the same as a start point of the source moving track, and the partial same path is a discontinuous path.

13. A data collection method, comprising:

receiving information of a movement preference of a user sent by a movement information collection device; and determining other user corresponding to the movement preference based on the information of the movement preference of the user.

14. The data collection method according to claim 13, wherein, the receiving information of a movement preference of a user sent by a movement information collection device comprises:

receiving information of the movement type of the user sent by the movement information collection device; and the determining other user corresponding to the movement preference based on the information of the movement preference of the user comprises:

assigning the user to a group comprising other user corresponding to the movement type, based on the information of the movement type of the user.

15. The data collection method according to claim 14, further comprising:

receiving a movement position and/or a movement time of the user; and assigning the user to a group comprising other user corresponding to the movement position and/or the movement time, based on the movement position and/or the movement time.

16. The data collection method according to claim 13, wherein, the receiving information of a movement preference of a user sent by a movement information collection device comprises:

receiving a source moving track sent by the movement information collection device, wherein the source moving track comprises position information of a plurality of positions of movement of the user and time information of the source moving track;

the determining other user corresponding to the movement preference based on the information of the movement preference of the user comprises:

searching for a user that moves in at least one position of the plurality of positions in a target time based on the source moving track, and taking the user as a recommended user, wherein a difference between the target time and a time represented by the time information is less than a preset time threshold; and the method further comprises:

sending user information of the recommended user.

17. The data collection method according to claim 16, wherein, the source moving track comprises position information and time information of a start point, a plurality of positions and an end point of the source moving track; and a difference between the target time and a time interval formed by the start point and the end point of the source moving track is less than a preset time threshold.

18. The data collection method according to claim 17, wherein the searching for a user that moves in at least one position of the plurality of positions in a target time according to the source moving track and taking the user as a recommended user comprises:

performing a road section matching on a plurality of positions comprised in the source moving track to obtain a plurality of road sections passed through by the source moving track, and calculating an order in which the source moving track passes through the road sections, based on time information of the positions; and searching for a user that moves in at least one road section of the plurality of road sections passed through by the source moving track in the target time, and taking the user as the recommended user.

19. The data collection method according to claim 18, wherein the recommended user comprises at least one of:

a first user whose moving track in the target time coincides with the source moving track;

a second user whose moving track in the target time is a portion of the source moving track;

a third user whose moving track in the target time comprises the source moving track;

a fourth user whose moving track in the target time has a partial same path as the source moving track, wherein the partial same path is a continuous path; and a fifth user whose moving track in the target time has a partial same path as the source moving track, wherein a start point of movement of the fifth user is the same as a start point of the source moving track, and the partial same path is a discontinuous path.

20. The data collection method according to claim 19, wherein the searching for a user that moves in at least one road section of the plurality of sections passed through by the source moving track in the target time and taking the user as the recommended user comprises:

determining whether the first user exists, and taking the first user as the recommended user if the first user exists;

determining whether the second user exists if the first user does not exist, and taking the second user as the recommended user if the second user exists;

determining whether the third user exists if neither of the first user and the second user exists, and taking the third user as the recommended user if the third user exists;

determining whether the fourth user exists if none of the first user, the second user and the third user exists, and taking the fourth user as the recommended user if the fourth user exists; and determining whether the fifth user exists if none of the first user, the second user, the third user and the fourth user exists, and taking the fifth user as the recommended user if the fifth user exists.

* * * * *